(12) United States Patent
Kim et al.

(10) Patent No.: US 9,607,157 B2
(45) Date of Patent: Mar. 28, 2017

(54) METHOD AND DEVICE FOR PROVIDING A PRIVATE PAGE

(71) Applicant: SAMSUNG ELECTRONICS CO., LTD., Suwon-si (KR)

(72) Inventors: Yoon-su Kim, Seoul (KR); Jung-joo Sohn, Seoul (KR); Keum-koo Lee, Yongin-si (KR); Young-kyu Jin, Seoul (KR); Yong-gook Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 245 days.

(21) Appl. No.: 14/227,541

(22) Filed: Mar. 27, 2014

(65) Prior Publication Data

US 2014/0298478 A1     Oct. 2, 2014

Related U.S. Application Data

(60) Provisional application No. 61/805,632, filed on Mar. 27, 2013.

(30) Foreign Application Priority Data

Jul. 11, 2013    (KR) ........................ 10-2013-0081785

(51) Int. Cl.
*G06F 21/60*     (2013.01)
*G06F 3/0488*     (2013.01)
(Continued)

(52) U.S. Cl.
CPC ............ *G06F 21/60* (2013.01); *G06F 3/0488* (2013.01); *G06F 21/31* (2013.01);
(Continued)

(58) Field of Classification Search
CPC ...... G06F 21/60; G06F 21/6218; G06F 21/31; G06F 3/0488; G06F 21/6281;
(Continued)

(56) References Cited

U.S. PATENT DOCUMENTS

| 5,666,502 A | 9/1997 | Capps |
|---|---|---|
| 6,008,809 A | 12/1999 | Brooks |

(Continued)

FOREIGN PATENT DOCUMENTS

| EP | 2 112 583 A1 | 10/2009 |
|---|---|---|
| EP | 2230623 A1 | 9/2010 |

(Continued)

OTHER PUBLICATIONS

Communication dated Sep. 25, 2014, issued by the European Patent Office in counterpart European Application No. 14161980.9.

(Continued)

*Primary Examiner* — Matthew Smithers
(74) *Attorney, Agent, or Firm* — Sughrue Mion, PLLC

(57) ABSTRACT

Methods and devices for providing a private page are provided. A method includes operations of entering a security mode based on a user input; extracting the private page that corresponds to the security mode; and providing both the private page and a normal page that is provided during a normal mode, wherein the private page includes at least one object that is selected by a user so as to be provided during the security mode. A device includes a user input configured to receive a user input; a controller configured to enter a security mode based on the received user input, and extracting a private page that corresponds to the security mode; and a display configured to provide both the private page and a normal page that is provided during a normal mode, wherein the private page comprises at least one object that is selected by a user so as to be provided during the security mode.

38 Claims, 18 Drawing Sheets

(51) Int. Cl.
*G06F 21/62* (2013.01)
*H04W 12/02* (2009.01)
*G06F 21/31* (2013.01)

(52) U.S. Cl.
CPC ...... *G06F 21/6218* (2013.01); *G06F 21/6281* (2013.01); *H04W 12/02* (2013.01); *G06F 2221/2105* (2013.01); *G06F 2221/2149* (2013.01)

(58) Field of Classification Search
CPC ..... G06F 2221/2105; G06F 2221/2149; G06F 21/36; G06F 21/10–21/14; G06F 21/62–21/629; H04W 12/02; H04W 12/08
See application file for complete search history.

(56) References Cited

U.S. PATENT DOCUMENTS

| | | | |
|---|---|---|---|
| 6,397,337 B1 | 5/2002 | Garrett et al. | |
| 7,512,400 B2 | 3/2009 | Starbuck et al. | |
| 7,657,849 B2 | 2/2010 | Chaudhri et al. | |
| 8,046,721 B2 | 10/2011 | Chaudhri et al. | |
| 8,351,897 B2 | 1/2013 | Shin et al. | |
| 8,411,046 B2 | 4/2013 | Kruzeniski et al. | |
| 2005/0149879 A1 | 7/2005 | Jobs et al. | |
| 2005/0243979 A1 | 11/2005 | Starbuck et al. | |
| 2006/0167861 A1 | 7/2006 | Arrouye et al. | |
| 2006/0229097 A1 | 10/2006 | Flynt et al. | |
| 2007/0099642 A1 | 5/2007 | Jin et al. | |
| 2007/0150842 A1 | 6/2007 | Chaudhri et al. | |
| 2008/0020803 A1* | 1/2008 | Rios .................. | H04M 1/667 455/565 |
| 2008/0052717 A1 | 2/2008 | Lee | |
| 2008/0166993 A1 | 7/2008 | Gautier et al. | |
| 2008/0168368 A1 | 7/2008 | Louch et al. | |
| 2008/0320033 A1 | 12/2008 | Koistinen et al. | |
| 2009/0013275 A1 | 1/2009 | May et al. | |
| 2009/0013282 A1 | 1/2009 | Mercer | |
| 2009/0019120 A1 | 1/2009 | Muguda | |
| 2009/0083847 A1 | 3/2009 | Fadell et al. | |
| 2009/0094339 A1 | 4/2009 | Allen et al. | |
| 2009/0240647 A1 | 9/2009 | Green et al. | |
| 2009/0241072 A1 | 9/2009 | Chaudhri et al. | |
| 2010/0023892 A1 | 1/2010 | Rakesh et al. | |
| 2010/0070898 A1 | 3/2010 | Langlois et al. | |
| 2010/0088634 A1 | 4/2010 | Tsuruta et al. | |
| 2010/0146451 A1 | 6/2010 | Jun-Dong et al. | |
| 2010/0211872 A1 | 8/2010 | Rolston et al. | |
| 2010/0229115 A1 | 9/2010 | Augustine et al. | |
| 2010/0269040 A1 | 10/2010 | Lee | |
| 2010/0306705 A1 | 12/2010 | Nilsson | |
| 2010/0313156 A1 | 12/2010 | Louch et al. | |
| 2011/0047134 A1 | 2/2011 | Zhang et al. | |
| 2011/0093812 A1 | 4/2011 | Fong | |
| 2011/0126156 A1 | 5/2011 | Krishnaraj et al. | |
| 2011/0154290 A1 | 6/2011 | Kelly | |
| 2011/0167387 A1 | 7/2011 | Stallings et al. | |
| 2011/0175930 A1 | 7/2011 | Hwang et al. | |
| 2011/0202872 A1 | 8/2011 | Park | |
| 2011/0258581 A1 | 10/2011 | Hu | |
| 2011/0300831 A1 | 12/2011 | Chin | |
| 2011/0316884 A1 | 12/2011 | Giambalvo et al. | |
| 2012/0005569 A1 | 1/2012 | Roh | |
| 2012/0005577 A1 | 1/2012 | Chakra et al. | |
| 2012/0023573 A1* | 1/2012 | Shi .................. | G06F 3/04883 726/17 |
| 2012/0084734 A1* | 4/2012 | Wilairat .................. | G06F 21/36 715/863 |
| 2012/0117599 A1 | 5/2012 | Jin et al. | |
| 2012/0129496 A1 | 5/2012 | Park et al. | |
| 2012/0131471 A1 | 5/2012 | Terlouw et al. | |
| 2012/0164971 A1 | 6/2012 | Choi et al. | |
| 2012/0166997 A1* | 6/2012 | Cho .................. | G06F 21/6218 715/778 |
| 2012/0174042 A1 | 7/2012 | Chang | |
| 2012/0179969 A1 | 7/2012 | Lee et al. | |
| 2012/0210266 A1 | 8/2012 | Jiang et al. | |
| 2012/0256863 A1 | 10/2012 | Zhang et al. | |
| 2012/0272338 A1 | 10/2012 | Falkenburg et al. | |
| 2012/0289287 A1 | 11/2012 | Kokubo | |
| 2012/0290972 A1 | 11/2012 | Yook et al. | |
| 2012/0297298 A1 | 11/2012 | Dovey et al. | |
| 2012/0297304 A1 | 11/2012 | Maxwell | |
| 2012/0309433 A1 | 12/2012 | Jeong et al. | |
| 2012/0324357 A1 | 12/2012 | Viegers et al. | |
| 2013/0042191 A1 | 2/2013 | Kim et al. | |
| 2013/0047119 A1 | 2/2013 | Lee | |
| 2013/0052993 A1 | 2/2013 | Kwon et al. | |
| 2013/0053105 A1 | 2/2013 | Lee et al. | |
| 2013/0054548 A1 | 2/2013 | Fosback et al. | |
| 2013/0063452 A1 | 3/2013 | Ali et al. | |
| 2013/0063479 A1 | 3/2013 | Butlin et al. | |
| 2013/0067376 A1 | 3/2013 | Kim et al. | |
| 2013/0083210 A1 | 4/2013 | Beckham et al. | |
| 2013/0091468 A1 | 4/2013 | Xie | |
| 2013/0232256 A1 | 9/2013 | Lee et al. | |
| 2014/0040812 A1 | 2/2014 | Kurtz et al. | |
| 2014/0313218 A1* | 10/2014 | Lee .................. | G09G 5/10 345/589 |

FOREIGN PATENT DOCUMENTS

| | | |
|---|---|---|
| EP | 2 533 140 A1 | 12/2012 |
| EP | 2 551 762 A1 | 1/2013 |
| FR | 2971069 A | 8/2012 |
| JP | 3135104 B2 | 2/2001 |
| JP | 2004-191642 A | 7/2004 |
| JP | 2012-181847 A | 9/2012 |
| KR | 10-0683483 B1 | 2/2007 |
| KR | 10-2007-0115622 A | 12/2007 |
| KR | 10-2007-0120368 A | 12/2007 |
| KR | 10-2010-0027689 A | 3/2010 |
| KR | 10-2010-0114779 A | 10/2010 |
| KR | 10-2010-0134234 A | 12/2010 |
| KR | 10-2011-0011226 A | 2/2011 |
| KR | 10-2011-0026811 A | 3/2011 |
| KR | 10-2012-0006805 A | 1/2012 |
| KR | 10-2012-0054837 A | 5/2012 |
| KR | 10-2012-0126161 A | 11/2012 |
| KR | 10-2012-0131906 A | 12/2012 |
| KR | 10-2013-0024074 A | 3/2013 |
| KR | 10-2013-0024346 A | 3/2013 |
| RU | 2347258 C2 | 2/2009 |
| RU | 2363039 C2 | 7/2009 |
| WO | 2010/110613 A1 | 9/2010 |
| WO | 2010/144331 A2 | 12/2010 |
| WO | 2012032180 A1 | 3/2012 |
| WO | 2013/022849 A1 | 2/2013 |

OTHER PUBLICATIONS

Communication dated Oct. 9, 2014, issued by the European Patent Office in counterpart European Application No. 14161998.1.
Communication dated Oct. 10, 2014, issued by the European Patent Office in counterpart European Application No. 14161616.9.
Communication dated Nov. 5, 2014, issued by the European Patent Office in counterpart European Application No. 14161672.2.
Communication dated Nov. 6, 2014, issued by the European Patent Office in counterpart European Application No. 14161739.9.
"Private Desktop, Product Information", Tropical Software Website, Jul. 1, 2012, 2 pages total, XP055142907.
"Private Desktop, Screen Shots", Tropical Software Website, Jul. 1, 2012, 5 pages total, XP 055142903.
J R Raphael, "Android Power Tip : Put Your Dialer on Your Home Screen (or Lock Screen)", Jan. 15, 2013, 6 pages total, XP 55143362.
Communication dated Aug. 28, 2014 issued by the European Patent Office in counterpart European Patent Application No. 14161672.2.
Communication dated Jun. 26, 2014 issued by the International Searching Authority in counterpart International Patent Application No. PCT/KR2014/002472.

(56) References Cited

OTHER PUBLICATIONS

Alexandra Chang; "Up Close with iOS 5: New Gestures"; Macworld; Oct. 14, 2011; 4 total pages; XP055135715.
"Overview of webOS—User Interface"; HP webOS Developer Center; Jan. 13, 2012; 4 total pages; XP055135739.
"HP/Palm WebOS—Multi-tasking Made Easy, Featuring the Palm Pre Plus"; Mar. 19, 2010; 1 total page; XP054975489.
Communication dated Jul. 3, 2014 issued by the International Searching Authority in counterpart International Patent Application No. PCT/KR2014/002481.
Communication dated Jul. 2, 2014 issued by the International Searching Authority in counterpart International Patent Application No. PCT/KR2014/002464.
Communication dated Jul. 2, 2014 issued by the International Searching Authority in counterpart International Patent Application No. PCT/KR2014/002444.
Communication dated Jul. 2, 2014 issued by the International Searching Authority in counterpart International Patent Application No. PCT/KR2014/002443.
Communication dated Aug. 26, 2014 issued by the European Patent Office in counterpart European Patent Application No. 14161621.9.
Communication dated Jul. 3, 2014 issued by the International Searching Authority in counterpart International Patent Application No. PCT/KR2014/002489.
Communication dated Jul. 2, 2014 issued by the International Searching Authority in counterpart International Patent Application No. PCT/KR2014/002462.
Communication dated Oct. 6, 2016 issued by the Russian Patent Office in counterpart Russian Patent Application No. 2015145945/08.
Communication dated Oct. 6, 2016 issued by the European Patent Office in counterpart European Patent Application No. 14 161 980.9.
Gina Trapani; "Seven Easy Ways to Integrate Your Google Apps"; Sep. 9, 2009; XP055305805; 6 pages total.
Communication dated Feb. 8, 2017, issued by the Russian Patent Office in Russian Patent Application No. 2015145969.

\* cited by examiner

310

320

330

340

METHOD AND DEVICE FOR PROVIDING A PRIVATE PAGE

CROSS REFERENCE TO RELATED APPLICATIONS

This application claims the benefit of U.S. Provisional Patent Application No. 61/805,632, filed on Mar. 27, 2013, in the U.S. Patent and Trademark Office, and priority from Korean Patent Application No. 10-2013-0081785, filed on Jul. 11, 2013, in the Korean Intellectual Property Office, the disclosures of which are incorporated herein by reference, in their entireties.

BACKGROUND

1. Technical Field

Devices and methods consistent with the exemplary embodiments relate to a method and device for providing a private page that includes at least one object and is displayed during a security mode, as well as a normal page provided during a normal mode.

2. Description of the Related Art

Many users recently store and manage a plurality of pieces of information in their portable terminals. The plurality of pieces of information may have different security levels. For example, a security level of a financial application, which includes financial information, may be a highest security level, whereas a security level of a search application may have a relatively lower security level than the security level of the finance application.

However, when a user lends the user's portable terminal to another user, all information in the portable terminal may be disclosed to the other user. In this regard, it is very inconvenient for the user to set a password for each of the plurality of pieces of information.

Thus, there is a demand for a system that provides a storage space where a plurality of pieces of information having high security levels are conveniently collected and which are not easily exposed to other users.

SUMMARY

One or more exemplary embodiments include a method and device for providing a private page, so that applications, a plurality of pieces of data, notices, or the like, which are stored in the device, may be efficiently managed according to their security levels.

Additional aspects will be set forth in part in the description which follows and, in part, will be apparent from the description, or may be learned by practice of the exemplary embodiments.

According to one or more exemplary embodiments, a method of providing a private page includes operations of entering a security mode based on a user input; extracting the private page that corresponds to the security mode; and providing both the private page and a normal page that is provided during a normal mode, wherein the private page includes at least one object that is selected by a user so as to be provided during the security mode.

The at least one object may be prevented from being provided during the normal mode.

The at least one object includes at least one of an application, at least one function provided by the application, and at least one content provided by the application.

The method may further include operations of receiving a user input of moving a first object included in the normal page to the private page; displaying the first object in the private page; and preventing the first object and information related to the first object from being provided during the normal mode.

The information related to the first object may include at least one of an icon of the first object, installation information related to the first object, notice information related to the first object, and use history information related to the first object.

The operation of preventing may include operations of extracting a second object related to the first object; and preventing the second object or information related to the second object from being provided during the normal mode.

The operation of preventing may include an operation of displaying a predetermined indicator which indicates the private page on the private page.

The predetermined indicator may include at least one of a predetermined color, a predetermined background image, a predetermined icon and predetermined text.

The method may further include an operation of displaying an indicator on the at least one object included in the private page, wherein the indicator corresponds to the private page.

The method may further include an operation of displaying an image which corresponds to the security mode on a status information window.

The method may further include operations of detecting an occurrence of a notice event; determining a page that includes an object related to the notice event; and providing notice information, based on a notifying method that corresponds to the determined page.

The operation of providing the notice information may include operations of detecting an occurrence of a notice event related to an object included in the private page during the normal mode; and providing notice information related to the object, based on a notifying method that corresponds to the private page.

The operation of entering may include an operation of receiving a second user input that is distinguished from a first user input of entering the normal mode.

The security mode may include a plurality of security modes that respectively correspond to a plurality of user inputs.

The operation of entering may further include operations of entering a first security mode, based on a first user input; and entering a second security mode, based on a second user input.

The operation of entering the security mode may include an operation of distinguishing between the first user input and the second user input based on at least one of pattern information, number information, information related to a user's gaze direction, information related to a user's face, fingerprint information, tilt information and motion information that is input to a lock screen.

According to one or more exemplary embodiments, a device includes a user input configured to receive an input from a user; a controller configured to enter a security mode based on the user input, and extract a private page that corresponds to the security mode; and a display configured to provide both the private page and a normal page that is provided during a normal mode, wherein the private page is configured to include at least one object that is selected by a user so as to be provided during the security mode.

The controller may be configured to prevent the at least one object from being provided during the normal mode.

The at least one object may include at least one of an application, at least one function provided by the application, and at least one content provided by the application.

The controller may be configured to extract a second object related to the first object, and may prevent the second object or information related to the second object from being provided during the normal mode.

The display may be configured to display a predetermined indicator which is configured to indicate the private page on the private page.

The display may display an indicator on the at least one object included in the private page, wherein the indicator corresponds to the private page.

The display may display an image which corresponds to the security mode on a status information window.

The controller may be configured to detect an occurrence of a notice event, may determine a page that includes an object related to the notice event, and may provide notice information, based on a notifying method that corresponds to the determined page.

The controller may be configured to detect an occurrence of a notice event related to an object included in the private page during the normal mode, and may provide notice information related to the object, based on a notifying method that corresponds to the private page.

The user input may be configured to receive a second user input that is distinguished from a first user input of entering the normal mode.

The controller may be configured to enter a first security mode, based on a first user input, and may enter a second security mode, based on a second user input.

The controller may be configured to distinguish between the first user input and the second user input, based on at least one of pattern information, number information, information related to a user's gaze direction, information related to a user's face, fingerprint information, tilt information, and motion information that are input to a lock screen, but is not limited thereto.

An aspect of an exemplary embodiment may provide a plural mode device having a normal mode and at least one security mode, the device including: a user input configured to receive an input from a user to enter a normal mode or to enter one or more security modes; and a controller configured to enter a user into a normal mode in response to an input for a normal mode being input by a user, and to enter a user into a security mode in response to an input to enter a security mode being input by the user, wherein in normal mode a user has access to one or more normal pages and in security mode the user has access to the one or more normal pages and one or more pages designated by the user as private pages.

The plural mode device may further include a display configured to display the one or more normal pages in normal mode and display both the one or more private pages and the one or more normal pages in security mode.

The one or more private pages may include at least one object that is selected by a user so as to be provided during the security mode.

The controller may be configured to prevent private pages from being displayed during normal mode.

The at least one object may include at least one of an application, at least one function provided by the application, and at least one content provided by the application.

The user input may be configured to receive a user input to move a first object comprising a normal page to the one or more private pages.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF THE EXEMPLARY EMBODIMENTS

Figure 1:
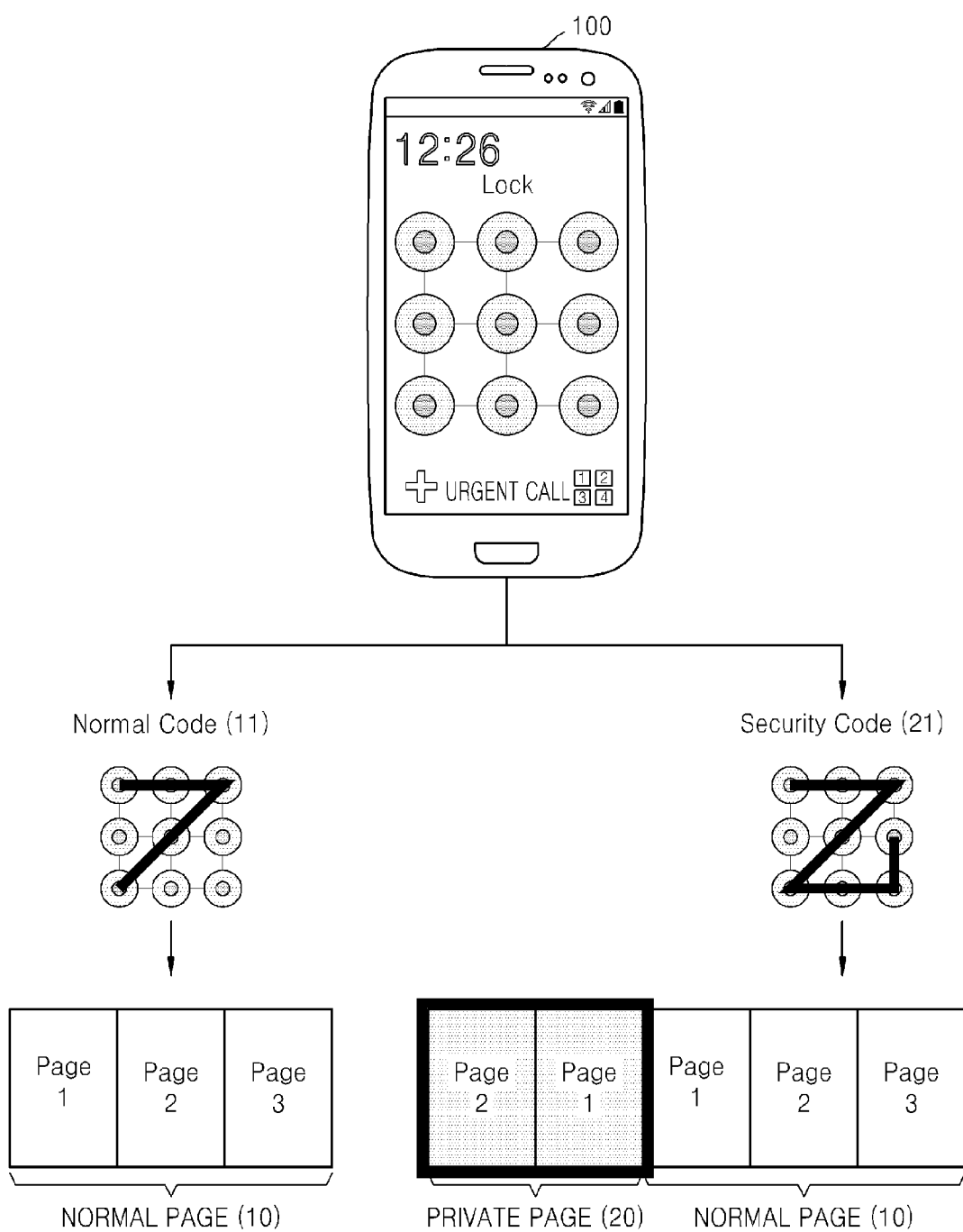
FIG. 1 is a diagram which illustrates a private page according to an exemplary embodiment.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein have to be defined based on the meaning of the terms together with the description throughout the specification.

When a part "includes" or "comprises" an element, unless there is a particular description contrary thereto, the part may further include other elements, not excluding the other elements. In the following description, terms such as "unit"

and "module" indicate a unit for processing at least one function or operation, wherein the unit and the block may be embodied as hardware or software or may be embodied by combining hardware and software.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram which illustrates a private page according to an exemplary embodiment.

A device 100 in an exemplary embodiment may provide a normal mode and a security mode, based on a type of user input.

In an exemplary embodiment, the normal mode indicates a basic mode set in the device 100. During the normal mode, the device 100 may provide a normal page 10 including one or more applications. The normal page 10 may include a plurality of pages.

In an exemplary embodiment, the security mode indicates a mode during which a private page that is not provided during the normal mode is additionally provided. For example, the device 100 may further provide a private page 20 as well as the normal page 10 during the security mode.

The private page 20 may include at least one object that is selected by a user. Here, the at least one object included in the private page 20 is not provided during the normal mode.

The at least one object included in the private page 20 may include at least one of an application, at least one function from among functions provided by the application, and at least one piece of data (e.g., content, use history, etc.) provided by the application, but one or more exemplary embodiments are not limited thereto.

Throughout the specification, the term "application" means a group of computer programs designed to perform a particular work. The application described in the present application may vary. For example, the application may include, but is not limited to, a game application, a video reproducing application, a map application, a memo application, a broadcasting application, an exercise support application, a payment application and a photo editing application.

Throughout the specification, the term "content" means digital information that is provided via a wired or wireless communication network. In one or more exemplary embodiments, the content may include, but is not limited to, moving picture content (e.g., a TV program image, video-on-demand (VOD), a personal image such as User-Created Contents (UCC), a music video, a YouTube video, etc.), still image content (e.g., a photo, a picture, etc.), text content (e.g., an electronic book (poetry, novels, etc.), a letter, a work file, a web page, or the like), music content (e.g., music, radio broadcasting, or the like) and an application (a widget, a game, etc.).

The device 100 may enter the normal mode or the security mode, depending on a type of user input. For example, in response to the device 100 receiving a first user input (e.g., a normal code 11), the device 100 may enter the normal mode, and in response to the device 100 receiving a second user input (e.g., a security code 21), the device 100 may enter the security mode.

In the present embodiment, the user input may include, but is not limited to, at least one of a touch input, a bending input, a voice input, and a multimodal input.

Throughout the specification, the term "touch input" indicates a gesture of the user, which is performed on a touch screen so as to control the device 100. For example, the touch input may include a tap gesture, a touch & hold gesture, a double tap gesture, a drag gesture, a panning gesture, a flick gesture, a drag & drop gesture, or the like.

"Tapping" is a user's motion of touching a screen with a finger or a touch tool (e.g., a stylus pen) and then instantly lifting the finger or touch tool from the screen. That is, in the tap gesture, a time difference between a touch-in time at which the finger or touch tool touches the screen and a touch-out time at which the finger or touch tool is lifted from the screen is very short.

"Touching & holding" is a user's motion of touching a screen with a finger or a touch tool (e.g., a stylus pen) and then maintaining the touch motion over a critical period of time, after touching the screen. For example, a time difference between a touch-in time and a touch-out time is greater than or equal to the critical period of time. In response to a touch input lasting more than the critical time, in order to inform the user whether the touch input is tapping or touching & holding, a feedback signal may be provided in a visual or acoustic manner.

"Double tapping" is a user's motion of rapidly touching the screen twice with a finger or touch tool (such as a stylus pen).

"Dragging" is a user's motion of touching a screen with the finger or touch tool and moving the finger or touch tool to another position on the screen while touching the screen. The dragging motion may enable a moving or panning motion of an object.

"Panning" is a user's motion of performing a dragging motion without selecting an object. Since no object is selected in the panning motion, no object is moved in a page but the page itself is moved on the screen or a group of objects may be moved within a page.

"Flicking" is a user's motion of rapidly performing a dragging motion with the finger or touch tool. The dragging (panning) motion or the flicking motion may be distinguished based on whether or not a moving speed of the finger or touch tool is greater than a critical speed.

"Dragging & Dropping" is a user's motion of dragging an object to a predetermined position on the screen with the finger or touch tool and then dropping the object at that position.

"Pinching" is a user's motion of moving two fingers touching the screen in opposite directions. The pinching motion is a gesture to magnify (open pinch) or contract (close pinch) an object or a page. A magnification value or a contraction value is determined according to the distance between the two fingers.

"Swiping" is a user's motion of touching an object on the screen with the finger or touch tool and simultaneously moving the object horizontally or vertically by a predetermined distance. A swiping motion in a diagonal direction may not be recognized as a swiping event.

Throughout the specification, the term "motion input" indicates a motion that a user does with the device 100 so as to control the device 100. For example, the motion input may include an input of the user who rotates the device 100, tilts the device 100, or moves the device 100 in up and down or right and left directions. The device 100 may sense a motion input that is preset by the user, by using an acceleration sensor, a tilt sensor, a gyro sensor, a 3-axis magnetic sensor, etc.

Throughout the specification, the term "bending input" indicates an input of a user who bends a whole or partial area of the device 100 so as to control the device 100, and here, the device 100 may be a flexible display device. In an exemplary embodiment, the device 100 may sense a bending position (a coordinates value), a bending direction, a bending angle, a bending speed, the number of times that the bending motion is performed, a time of occurrence of the bending motion, a hold time of the bending motion, etc.

Throughout the specification, the term "multimodal input" indicates a combination of at least two input methods. For example, the device 100 may receive a touch input and a motion input of the user, or may receive a touch input and a voice input of the user. Also, the device 100 may receive a touch input and an eye input of the user. The eye input indicates an input by which the user adjusts a blink of an eye, a gaze position, a moving speed of an eye, etc., so as to control device 100.

In an exemplary embodiment, the device 100 may be embodied in various forms. For example, the device 100 may include, but is not limited to, a mobile phone, a smartphone, a laptop computer, a tablet PC, an electronic book terminal, a digital broadcast terminal, a personal digital assistant (PDA), a portable multimedia player (PMP), a navigation device and an MP3 player.

Hereinafter, a method of creating the private page 20 that is provided during the security mode, the method performed by the device 100, will now be described with reference to FIGS. 2 through 4.

Figure 2:
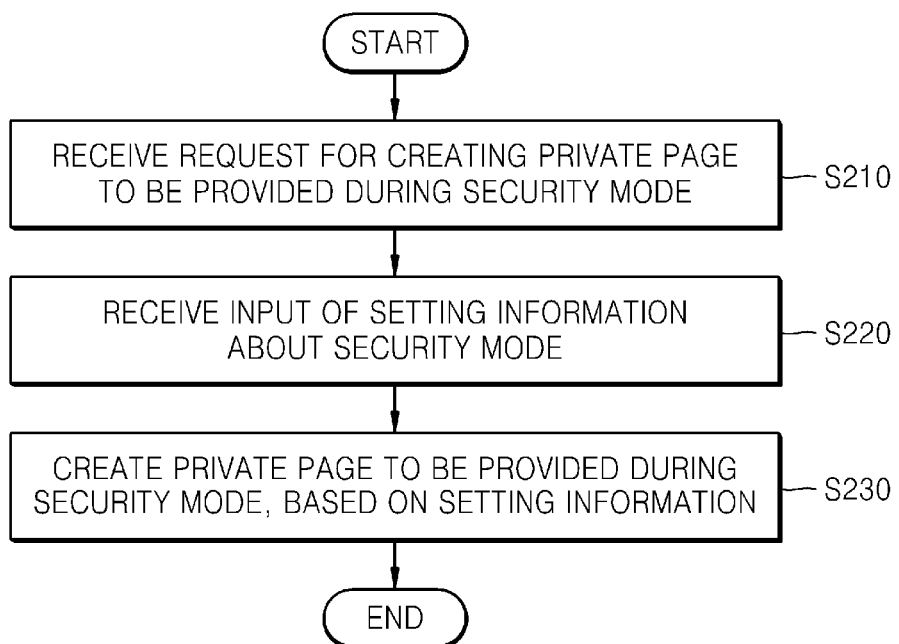
FIG. 2 is a flowchart of a method of creating a private page, according to an exemplary embodiment.

FIG. 2 is a flowchart of a method of creating a private page, according to an exemplary embodiment.

In operation S210, the device 100 may receive a request for creating a private page to be provided during a security mode. For example, in response to the device 100 operating in a normal mode, a user may activate a use of the security mode in a configuration setting, and may select a private page creation item. In response to the device 100 operating in the security mode, the user may select a private page addition item.

In operation S220, the device 100 may receive an input of setting information regarding the security mode. For example, the device 100 may receive, from the user, information related to a user input (e.g., a password, a touch pattern, etc.) for entering the security mode, identification (ID) information (e.g., an ID image, an ID icon, an ID color, etc.) for distinguishing between the security mode and other modes, notifying method information related to an object included in the security mode, etc. In other exemplary embodiments, the setting information related to the security mode may be expressed as setting information related to a private page.

In operation S230, the device 100 may create the private page to be provided during the security mode, based on the setting information (e.g., the password for entering the security mode, the ID information indicating the security mode, the notifying method information, etc.) related to the security mode. The device 100 may display the private page on a screen of the device 100.

According to an exemplary embodiment, the user may select at least one object from among objects included in the normal page, may move the at least one selected object to the private page, and thus may prevent the at least the one selected object from being exposed during the normal mode.

Hereinafter, with reference to FIGS. 3 and 4, a process in which the device 100 creates the private page will now be described in detail.

Figure 3:
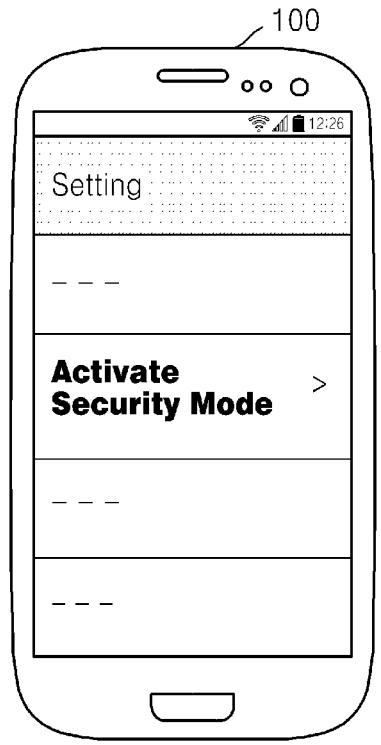
FIG. 3 illustrates an example of a graphical user interface (GUI) for creating a private page, according to an exemplary embodiment.
Figure 3:
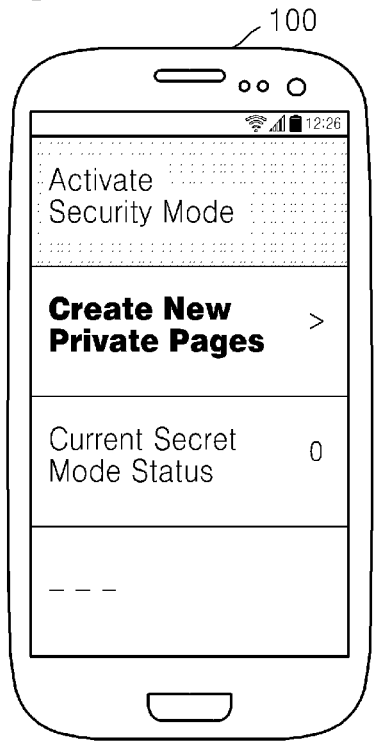
Figure 3:
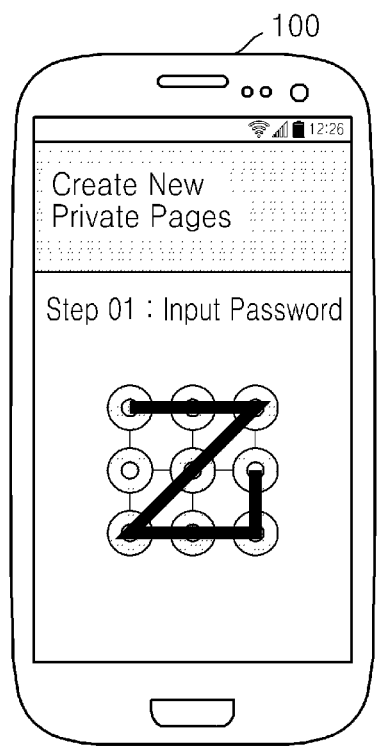
Figure 3:
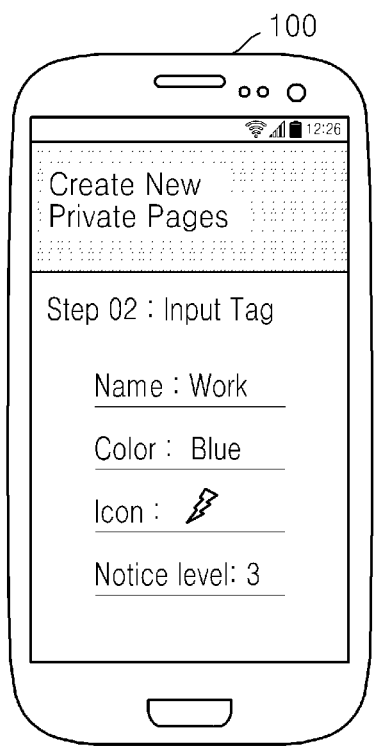

FIG. 3 illustrates an example of a graphical user interface (GUI) for creating a private page, according to an exemplary embodiment.

Referring to 310, the device 100 may display the GUI for setting a security mode on a screen of the device 100. The device 100 may switch an inactive state of the security mode into an active state. In this case, the device 100 may support not only a normal mode for providing normal pages but may also additionally support the security mode in which a private page and a normal page are provided together.

Referring to 320, the device 100 may receive, from a user, a request to create a new private page. The device 100 may display, on the screen, an input window for receiving an input of information (e.g., a password, a private page name, a private page color, an icon, a notice level, etc.) that is necessary in generating the private page.

Referring to 330, the device 100 may receive, from the user, an input of a password for entering the security mode. The password may be variously configured. For example, the password may be configured by using at least one of numbers, text, a touch pattern, a voice, bending information, gaze information of the user, bio-information of the user, and motion information of the user. Hereinafter, for convenience of description, it is assumed that the password is configured as a touch pattern.

Referring to 340, the device 100 may receive, from the user, an input of setting information related to the private page. For example, the user may input 'work' as the private page name, may input 'blue' as the private page color to identify the private page, may select a lighting form as the icon to identify the private page, and may select 'level 3' as the notice level related to an object included in the private page. The notice level means a level at which notice information is displayed when a notice event related to the object included in the private page occurs. The notice level will be described in detail with reference to FIG. 15.

Figure 4B:
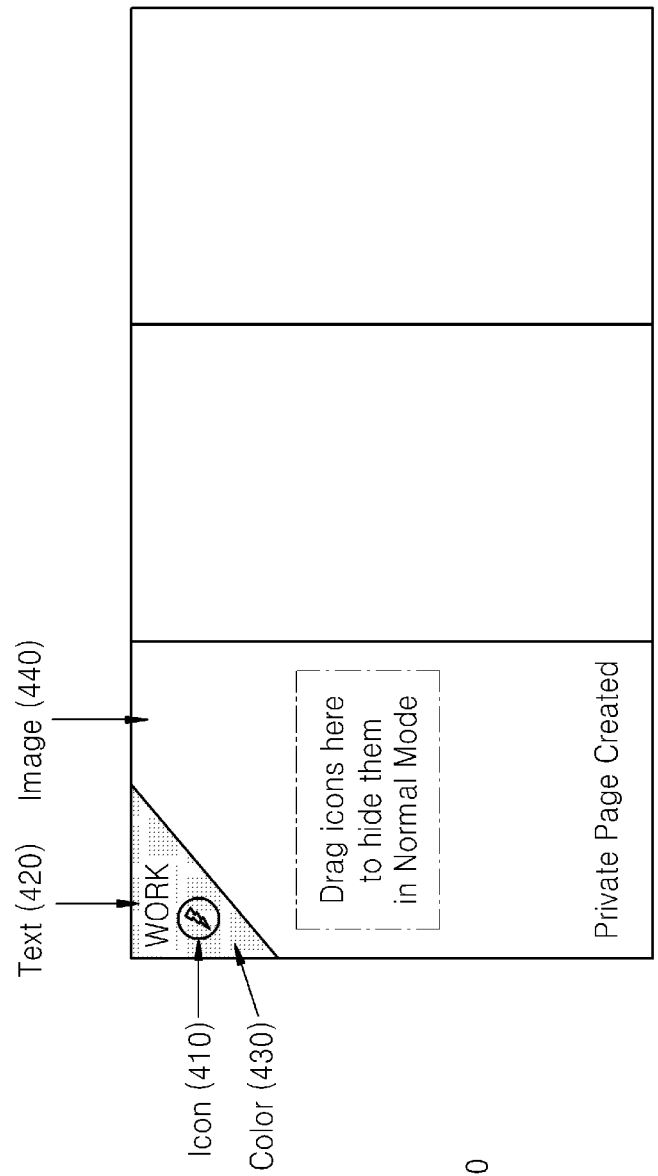
FIGS. 4A and 4B illustrate an example of a private page, according to an exemplary embodiment.
Figure 4A:
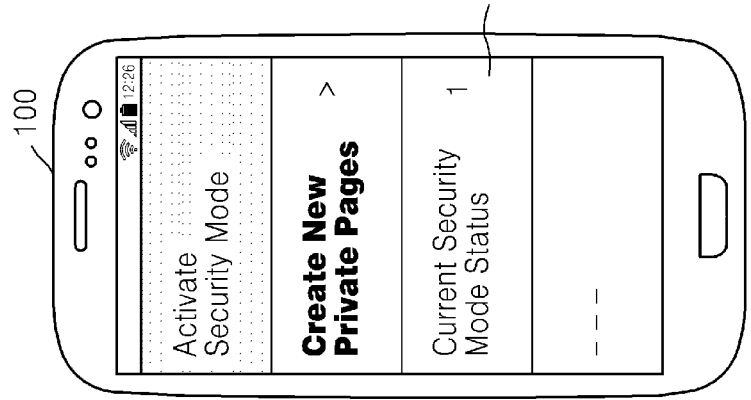

FIGS. 4A and 4B illustrate an example of a private page, according to an exemplary embodiment.

As illustrated in FIG. 4A, the device 100 may create the private page to be provided during a security mode, based on setting information input by a user. The device 100 may provide information related to the total number of security modes that are currently supported. For example, in response to one security mode being set, the device 100 may display a current security mode status 400 as '1.'

As illustrated in FIG. 4B, according to the setting information input by the user, the device 100 may display the private page including an icon 410 (e.g., a lighting form) which indicates the private page, a private page name 420 (e.g., a work), a color 430 (e.g., a blue color) for identifying the private page, and a background image 440 for identifying the private page. Thus, the user may intuitively recognize whether a current page is a normal page or a private page.

Figure 5:
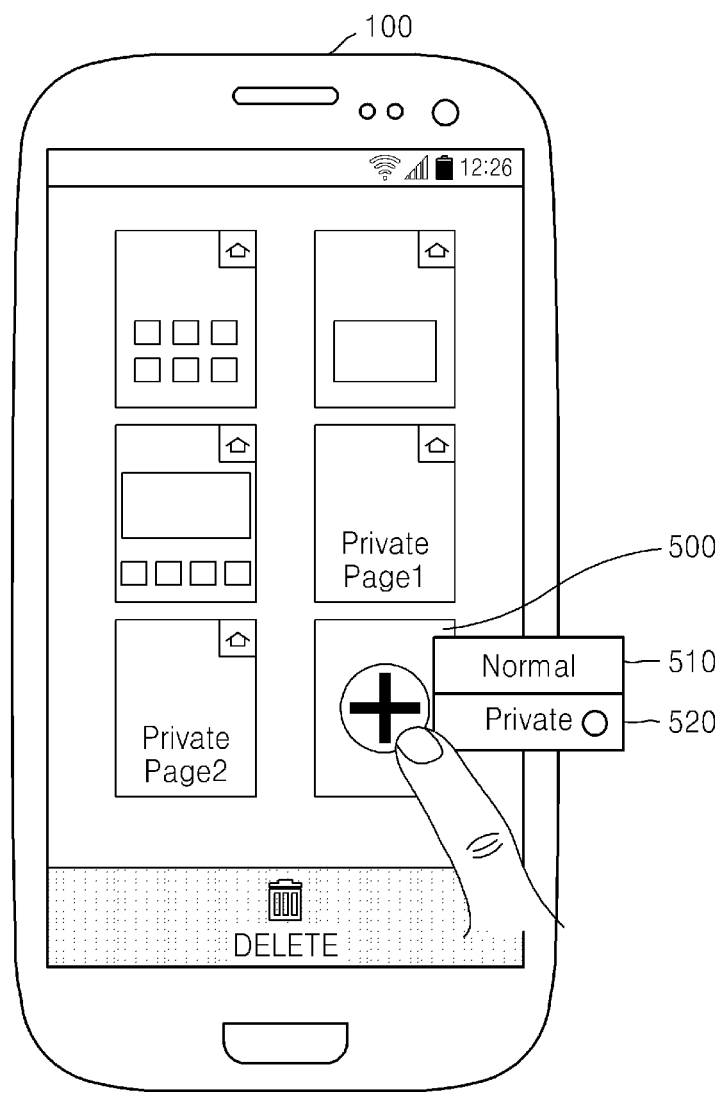
FIG. 5 illustrates a GUI for adding a private page, according to an exemplary embodiment.

FIG. 5 illustrates a GUI for adding a private page, according to an exemplary embodiment.

As illustrated in FIG. 5, the device 100 may display the GUI for adding the private page during a security mode. For example, the device 100 may receive a pinch input of a user with respect to a screen of the device 100. Then, the device 100 may provide an editing mode by displaying all pages in a thumbnail form on the screen.

In response to the user selecting a page addition button 500, the device 100 may provide a selection window for receiving an input of selecting a type of a page to be added. In response to the user selecting a normal page 510 via the selection window, the device 100 may additionally create the normal page 510. However, in response to the user selecting a private page 520 via the selection window, the device 100 may additionally create the private page 520. The private page 520 may include an icon, a color, a background image, a name, etc., that are previously set.

Figure 6:
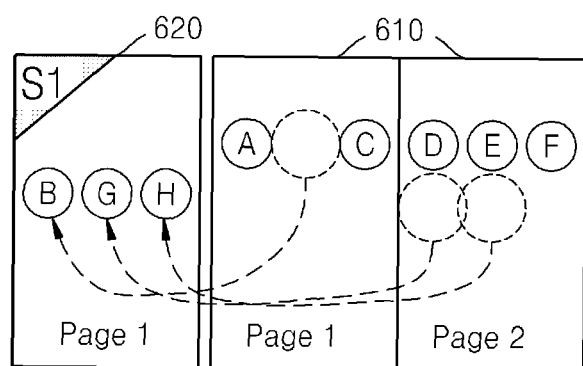
FIG. 6 illustrates an example in which at least one of objects included in a normal page is moved to a private page, according to an exemplary embodiment.

FIG. 6 illustrates an example in which at least one of objects included in a normal page is moved to a private page, according to an exemplary embodiment.

As illustrated in FIG. 6, the device 100 may move one or more objects included in a normal page 610 to a private page 620, based on a user input, and may display the one or more objects. For convenience of description, it is assumed that the one or more objects are applications.

A user may touch and drag a B application included in a page 1 of the normal page 610 to the private page 620 while the user maintains the touch. Also, the user may touch and drag G and H applications included in a page 2 of the normal page 610 to the private page 620 while the user maintains the touch. Here, the B, G, and H applications that are moved to the private page 620 are prevented from being provided during a normal mode.

Thus, the user may move a finance-related application requiring security, an account book application, a schedule management application requiring privacy protection, an album application, etc. to the private page 620 so that they are provided only during a security mode.

Referring to FIG. 6, the one or more objects are moved by a touch and drag input but one or more exemplary embodiments are not limited thereto. For example, the user may move the one or more objects to the private page 620 by a long touch input by which an object is touched over a predetermined period of time, or a double tap input.

Figure 7:
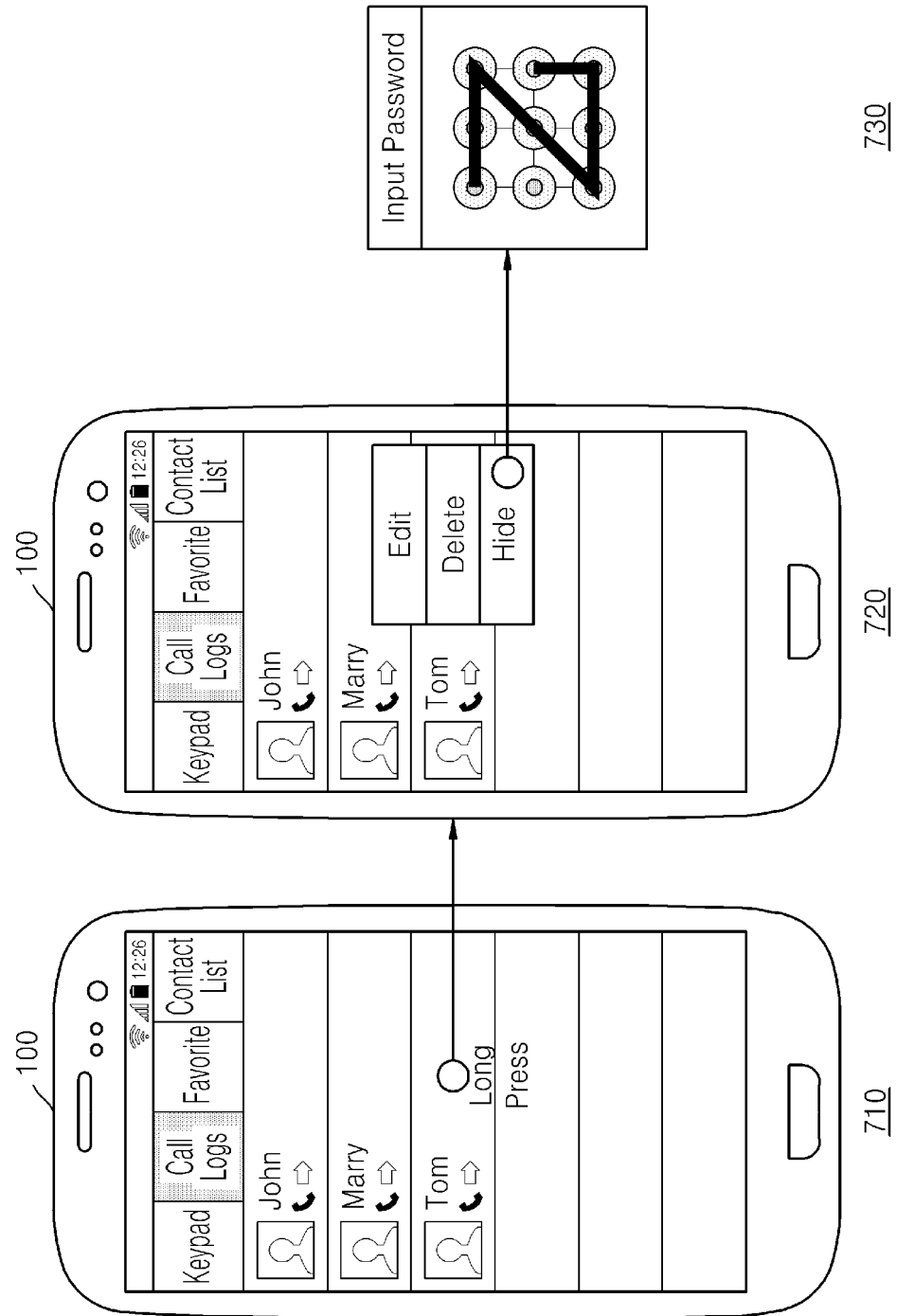
FIG. 7 illustrates an example in which at least one piece of data is moved to a private page, according to an exemplary embodiment.

FIG. 7 illustrates an example in which at least one piece of data is moved to a private page, according to an exemplary embodiment.

According to an exemplary embodiment, the device 100 may move an application included in a normal page to the private page or may move at least one piece of data included in the normal page to the private page.

Referring to 710, the device 100 may execute a phone number application. Then, the device 100 may receive, from a user, an input of selecting at least one item of a phone number list.

For example, the user may want Tom's phone number to not be provided during a normal mode but rather is provided via a private page during a security mode. Here, the user may touch an area of the phone number list in which Tom is displayed, over a predetermined period of time (e.g., 3 seconds).

Referring to 720, in response to the device 100 receiving a user input of touching a particular item (e.g., 'Tom') of the phone number list over the predetermined time (e.g., 3 seconds), the device 100 may provide an editing window for editing the particular item (e.g., 'Tom'). For example, the user may revise information related to the particular item (e.g., 'Tom') in the device 100 or may delete the information related to the particular item (e.g., 'Tom'), via the editing window. Also, the user may select 'Hide' and thus may move the particular item (e.g., 'Tom') and the information related to the particular item (e.g., 'Tom') to the private page.

Referring to 730, in response to the user attempting to move the particular item (e.g., 'Tom') to the private page, the device 100 may request the user to input a preset password that corresponds to a security mode. In response to the password being successfully authenticated, the device 100 may move the particular item (e.g., 'Tom') selected by the user, and the information related to the particular item (e.g., 'Tom') to the private page.

Although the exemplary embodiment shown in FIG. 7 is related to the phone number list, one or more exemplary embodiments are not limited thereto. For example, the user may move at least one picture from a photo album to the private page, or may move at least one item of musical content from a music folder to the private page.

Hereinafter, a method of providing a private page including at least one user-selected object, the method performed by the device 100, will now be described in detail with reference to FIG. 8.

Figure 8:
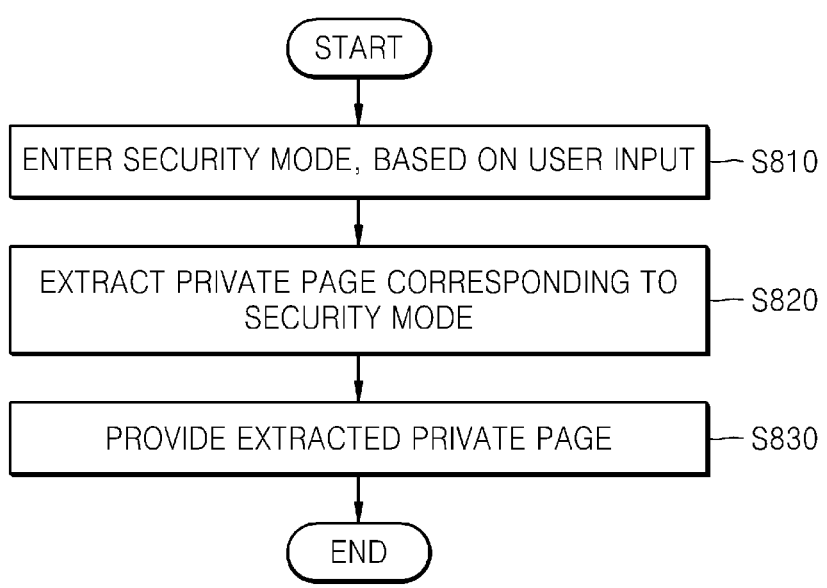
FIG. 8 is a flowchart of a method of providing a private page, according to an exemplary embodiment.

FIG. 8 is a flowchart of a method of providing a private page, according to an embodiment of the present invention.

In operation S810, the device 100 may enter a security mode, based on a user input. For example, the device 100 may receive a second user input that is distinguished from a first user input of entering a normal mode. Here, the device 100 may distinguish between the first user input of entering the normal mode and the second user input of entering the security mode, based on at least one of pattern information, number information, information related to a user's gaze direction, information related to a user's face, fingerprint information, tilt information, and motion information that are input to a lock screen.

For example, in response to a first touch pattern being input, the device 100 may enter the normal mode, and in response to a second touch pattern being input, the device 100 may enter the security mode. Also, in response to a user inputting a password while the user stares at a center of the lock screen, the device may enter the normal mode, and in response to the user inputting the password while the user gazes at an upper portion of the lock screen, the device may enter the security mode. In an exemplary embodiment, the device 100 may enter the normal mode in response to the password being input via a vertical screen mode, and the device 100 may enter the security mode when the password is input via a horizontal screen mode. In an exemplary embodiment, the device 100 may enter the normal mode only in response to a touch pattern being input, and the device 100 may enter the security mode in response to the device 100 receiving a motion input of shaking the device 100 over a predetermined number of times (e.g., 3 times) within a predetermined period of time (e.g., 3 sec.) after the touch pattern is input. The first user input of entering the normal mode and the second user input of entering the security mode may be distinguished from each other by using various methods.

In operation S820, the device 100 may extract the private page which corresponds to the security mode. For example, the device 100 may extract a pre-created private page to be provided during the security mode. In an exemplary embodiment, the device 100 may extract a plurality of private pages that correspond to the security mode.

In operation S830, the device 100 may provide the extracted private page. The device 100 may provide a normal page and the private page during the security mode. For example, the private page may include at least one object that is moved by the user from the normal page to the private page. Also, the private page may include an object that was installed on the private page from the beginning, due to a user's setting.

In response to the user designating an application type (e.g., a finance-related application), the device 100 may automatically install on the private page an application (e.g., a bank application, an insurance company application, a credit card company application, etc.) which corresponds to the application type.

The at least one object included in the private page may be prevented from being provided during the normal mode. For example, in response to the device 100 entering the normal mode, the user cannot recognize the private page and the at least one object included in the private page.

Also, information related to the at least one object included in the private page may be prevented from being provided during the normal mode. For example, the information related to the at least one object may include, but is not limited to, at least one of an object icon, object installation information, object notice information, and object use history information.

The device 100 may extract a second object related to a first object included in the private page, and may prevent the second object or information related to the second object from being provided during the normal mode. The second object related to the first object will be described in detail with reference to FIG. 11.

According to an exemplary embodiment, the object may include at least one of an application, at least one function provided by the application, and at least one content provided by the application. That is, compared to the normal page, the private page may further include a predetermined application, a predetermined function of the predetermined application, or a predetermined content provided by the predetermined application. Thus, according to an exemplary embodiment, although the same application is installed on both normal and private pages, a function and data that are provided by the application may be different in the normal page and the private page.

The device 100 may display a predetermined indicator which indicates the private page (or the security mode) on the private page. The predetermined indicator may include, but is not limited to, a predetermined color, a predetermined background image, a predetermined icon, and a predetermined text. For example, referring back to FIG. 4(b), the device 100 may display the private page name 420 (e.g., "WORK"), the icon 410 (e.g., the lighting form) indicating the private page, the color 430 (e.g., the blue color) for identifying the private page, the background image 440 (e.g., a brick pattern), etc.

The device 100 may display the predetermined indicator which indicates the private page (or the security mode) on the at least one object included in the private page. For example, in response to phone numbers of X, Y, and Z from among a phone number list may be checked only in the private page, the device 100 may display the predetermined indicator on items of the phone numbers of X, Y, and Z. The predetermined indicator will be described in detail with reference to FIG. 13.

The device 100 may display an image which corresponds to the security mode in a status information window. In response to the lighting form being selected as an icon for indicating the security mode, the device 100 may display the lighting form in a status information window displayed when the device 100 enters the security mode. Thus, by recognizing the status information window, the user may rapidly recognize a mode of the device 100.

Figure 9:
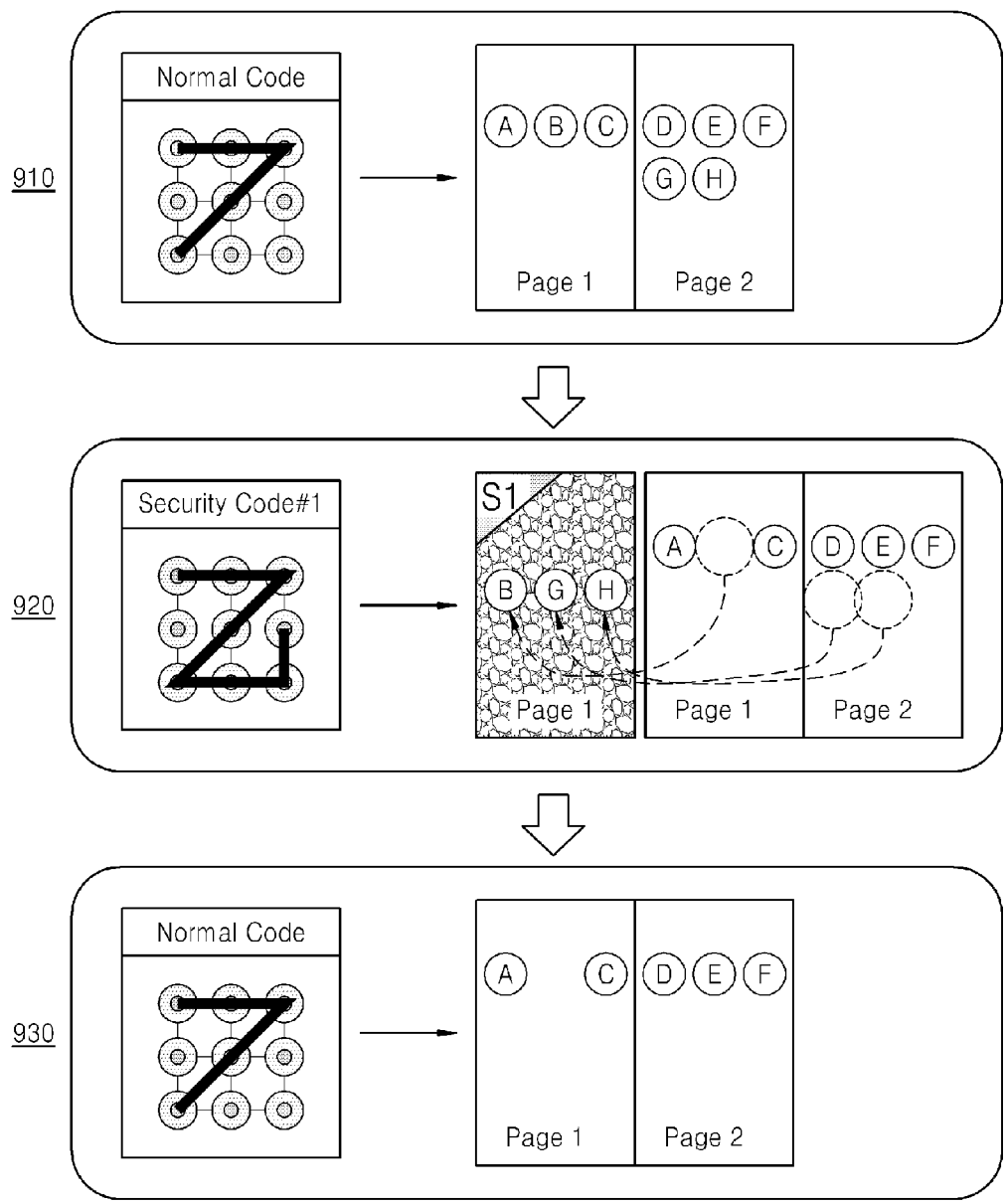
FIG. 9 is a diagram in which objects that are provided during each of normal and security modes are compared.

FIG. 9 is a diagram in which objects that are provided during each of normal and security modes are compared.

Referring to 910, the device 100 may receive a first user input (e.g., a normal code) via a locked screen. The device 100 may then enter a normal mode that corresponds to the first user input. The device 100 may display normal pages during the normal mode. The normal pages may include objects A, B, C, D, E, F, G, H.

Referring to 920, the device 100 may receive a second user input (e.g., a security code #1) via the locked screen. The device 100 may then enter a security mode that corresponds to the second user input. Also, the device 100 may additionally provide a private page as well as the normal pages during the security mode.

The device 100 may receive, from a user, an input of moving the B, G, H objects included in the normal pages to the private page. In this case, the device 100 may display the B, G, H objects in the private page and may delete the B, G, H objects from the normal pages.

Referring to 930, the device 100 may receive the first user input (e.g., the normal code) via the locked screen. The device 100 may then enter the normal mode that corresponds to the first user input, and may display the normal pages on a screen of the device 100. However, unlike the normal pages shown in 910, the user cannot check the B, G, H objects in the normal pages shown in 920. That is, in response to a particular object being moved by the user to the private page during the security mode, the particular object included in the private page is not provided during the normal mode.

In response to the user moving the particular object to the private page during the security mode, the device 100 may not provide information related to the particular object during the normal mode. For example, in response to the user moving a Chrome browser to the private page, a search history of searches via the Chrome browser, bookmarks related to the Chrome browser, etc., as well as the Chrome browser, may be moved to the private page. Thus, the device 100 may not provide the Chrome browser, the search history, information about the bookmarks, etc., during the normal mode. Although the Chrome browser may be installed again in the normal page at a later time, the search history, information regarding the bookmarks, etc., that are of the Chrome browser and were moved to the private page are not provided during the normal mode.

According to an exemplary embodiment, in response to the device 100 being connected to an external device (e.g., a PC) during the normal mode, the device 100 may not transmit information related to the B, G, H objects to the external device. On the other hand, in response to the device 100 being connected to the external device (e.g., the PC) during the security mode, the device 100 may transmit the information related to the B, G, H objects to the external device.

Figure 10:
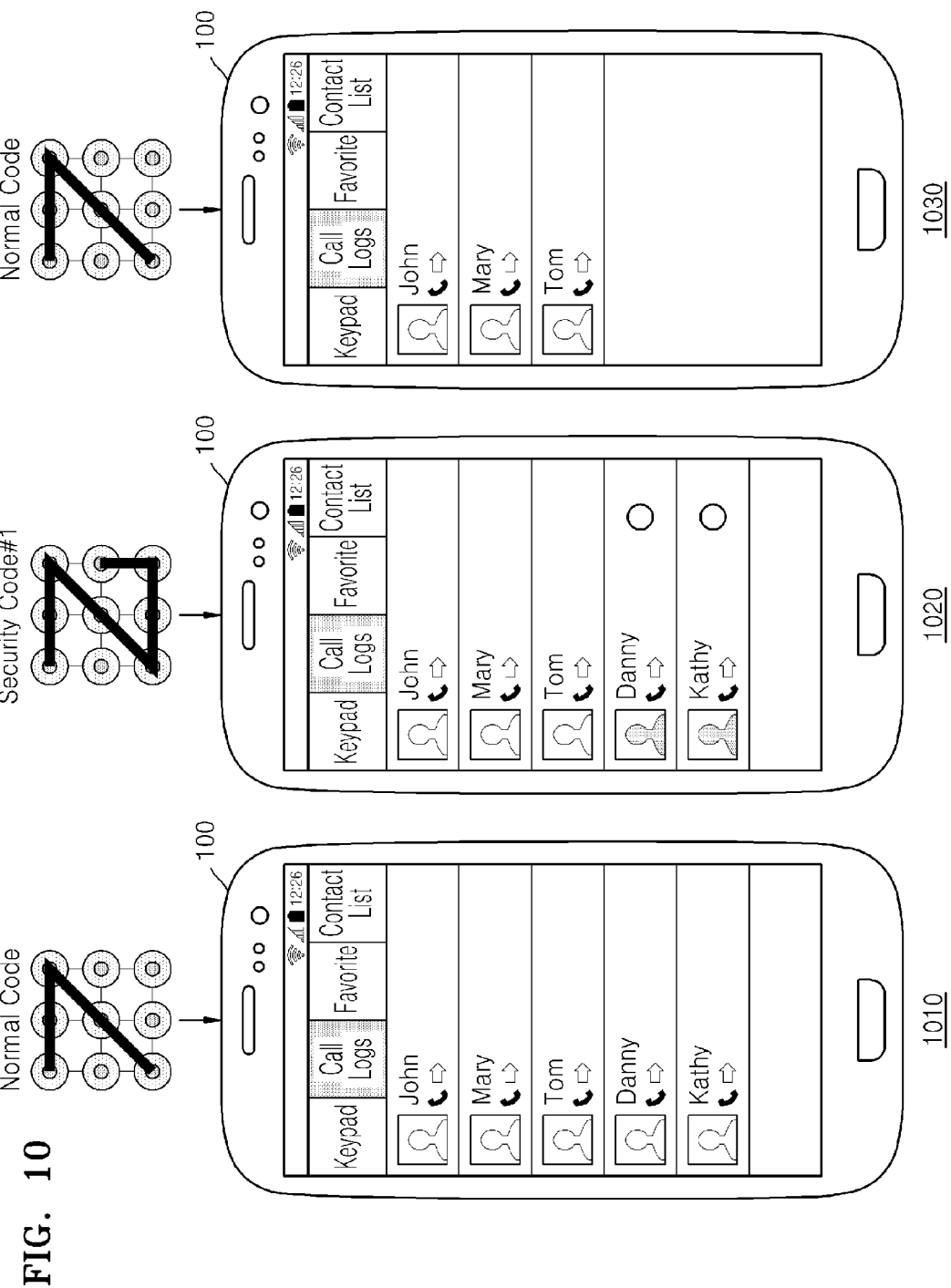
FIG. 10 illustrates an example in which a private page includes at least one piece of data of an application, according to an exemplary embodiment.

FIG. 10 illustrates an example in which a private page includes at least one piece of data of an application, according to an exemplary embodiment.

Referring to 1010, the device 100 may receive a first user input (e.g., a normal code) via a locked screen. The device 100 may then enter a normal mode that corresponds to the first user input. During the normal mode, the device 100 may execute a phonebook application included in a normal page. A phone number list may include phone numbers of John, Mary, Tom, Danny, Kathy, etc.

Referring to 1020, the device 100 may receive a second user input (e.g., a security code #1), via the locked screen. The device 100 may then enter a security mode that corresponds to the second user input. Also, the device 100 may additionally provide a private page as well as the normal page during the security mode.

The device 100 may receive an input of moving Danny and Kathy from the phone number list to the private page. In this case, the device 100 may copy the phonebook application, including Danny and Kathy, to the private page, and may delete Danny and Kathy from the phonebook application in the normal page.

Referring to 1030, the device 100 may receive the first user input (e.g., the normal code) via the locked screen. The device 100 may then enter the normal mode that corresponds to the first user input, and may display the normal page, including the phonebook application, on a screen of the device 100. In response to the phonebook application being executed, unlike the phone number list shown in 1010, the phone number list shown in 1030 may not include Danny and Kathy. That is, in response to a user moving particular data or a particular item to the private page during the security mode, the particular data or the particular item included in the private page is not provided during the normal mode.

In response to the user moving the particular data or the particular item to the private page during the security mode, the device 100 may not provide information related to the particular data or the particular item during the normal mode. For example, in response to the user selecting Danny and Kathy in the phone number list and moving them to the private page, the device 100 may not provide call histories, text message exchange histories, etc. of Danny and Kathy during the normal mode.

Figure 11:
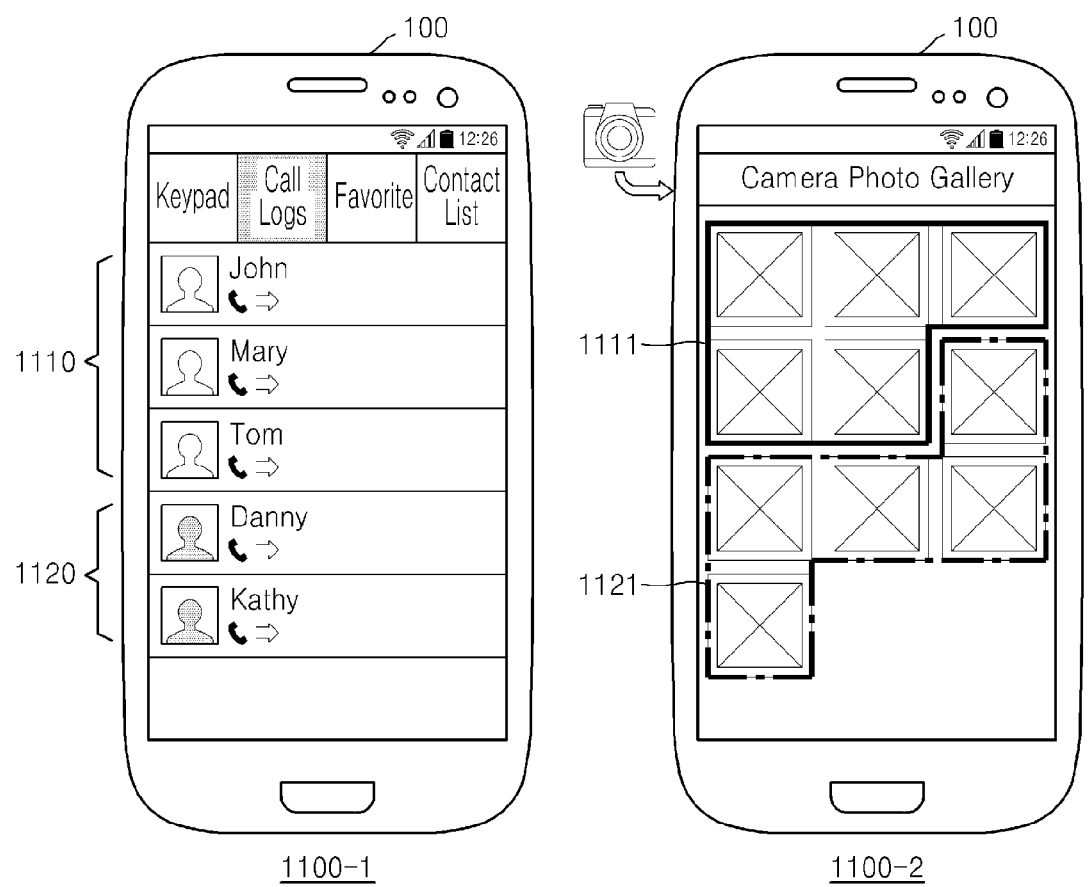
FIG. 11 illustrates an example in which a first object is moved to a private page and thus a second object related to the first object is moved to the private page, according to an exemplary embodiment.

FIG. 11 illustrates an example in which a first object is moved to a private page and thus, a second object related to the first object is moved to the private page, according to an exemplary embodiment.

Referring to 100-1, the device 100 may execute a phonebook application during a security mode and may display a phone number list on a screen of the device 100. A user may select, from the phone number list, phone numbers that the user wants to only provide in a security mode. For example, the user may select Danny and Kathy, and may move Danny and Kathy to the private page. In this case, a first user group (e.g., John, Mary, Tom) 1110 may be provided during both normal and security modes. However, a second user group (e.g., Danny and Kathy) 1120 may not be provided during the normal mode and may be provided only during the security mode.

Referring to 1100-2, the device 100 may distinguish between a plurality of image contents 1111 which correspond to the first user group (e.g., John, Mary, Tom) 1110 and a plurality of image contents 1121 which correspond to the second user group (e.g., Danny and Kathy) 1120 that is moved to the private page. The device 100 may not provide the image contents 1121 which correspond to the second user group (e.g., Danny and Kathy) 1120 that is moved to the private page during the normal mode and may provide the image contents 1121 only during the security mode.

Figure 12:
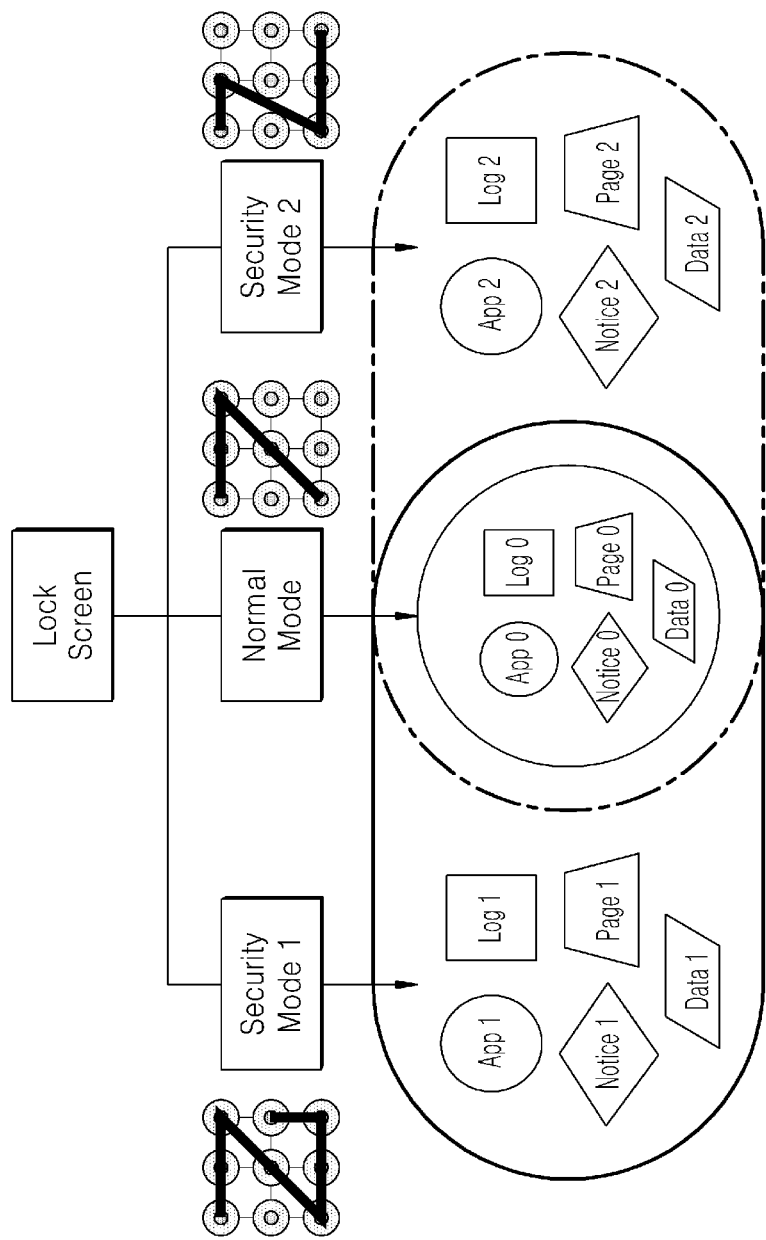
FIG. 12 illustrates a plurality of security modes according to an exemplary embodiment.

FIG. 12 illustrates a plurality of security modes according to an exemplary embodiment.

The device 100 may provide a plurality of security modes. The plurality of security modes may be respectively mapped with particular user inputs. For example, a first security mode may be mapped with a first user input (e.g., a first touch pattern), and a second security mode may be mapped with a second user input (e.g., a second touch pattern).

In a case where the device 100 receives the first user input (e.g., the first touch pattern) via a locked screen, the device 100 may enter a first security mode. The device 100 may then provide a private page which corresponds to the first security mode, as well as providing a normal page. For example, the device 100 may provide the normal page including a basic application App 0, a basic log Log 0, a basic notice Notice 1, and basic data Data 0, and the private page including a first application App 1, a first log Log 1, a first notice Notice 1, and first data Data 1.

According to an exemplary embodiment, in response to the device 1000 receiving the second user input (e.g., the second touch pattern) via the locked screen, the device 100 may enter the second security mode. The device 100 may then provide a private page which corresponds to the second security mode, as well as the normal page. For example, the device 100 may provide the normal page including the basic application App 0, the basic log Log 0, the basic notice Notice 0, and the basic data Data 0, and the private page including a second application App 2, a second log Log 2, a second notice Notice 2, and second data Data 2. The plurality of security modes are described in detail with reference to FIG. 13.

Figure 13:
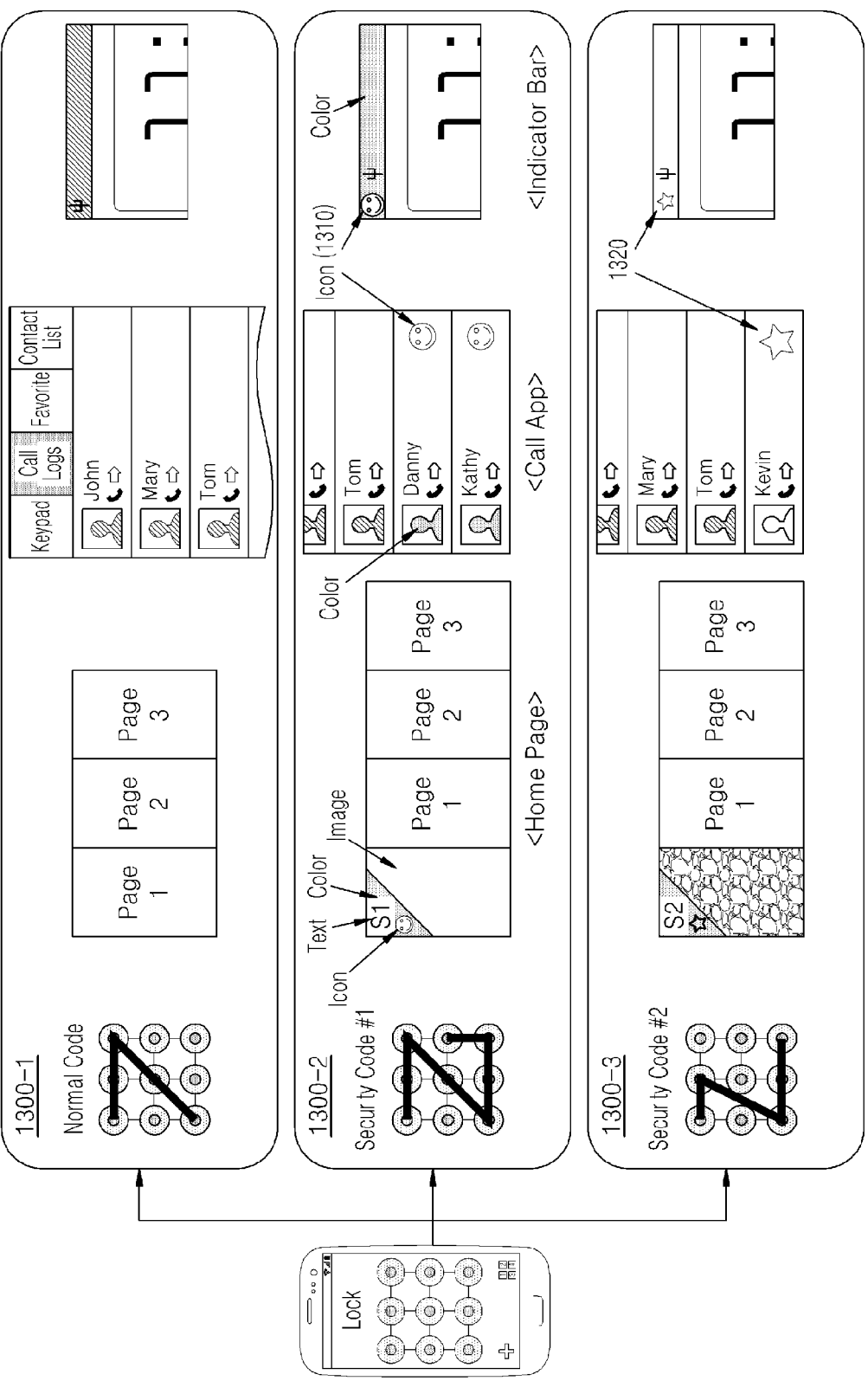
FIG. 13 illustrates private pages that respectively correspond to a plurality of security modes.

FIG. 13 illustrates private pages that respectively correspond to a plurality of security modes.

Referring to 1300-1, the device 100 may receive a first user input (e.g., a normal code) via a locked screen. The device 100 may enter a normal mode, based on the first user input (e.g., the normal code). In this case, the device 100 may display a normal page on a screen of the device 100. Also, the device 100 may not display a separate indicator on the normal page and a status information window during the normal mode.

Referring to 1300-2, the device 100 may receive a second user input (e.g., a security code #1) via the locked screen. The device 100 may enter a first security mode, based on the second user input (e.g., the security code #1). In this case, the device 100 may display a first private page which corresponds to the first security mode. Also, the device 100 may display a first indicator on the first private page or the status information window. The first indicator may include, but is not limited to, an icon (e.g. a smile icon), a text (e.g., S1), a color (e.g., a blue color), or a background image (e.g., a flower image) that are for identifying the first security mode (or the first private page).

In response to a smile icon 1310 being pre-selected as the icon for identifying the first security mode, the device 100 may display the smile icon 1310 on an area (e.g., an upper left area) of the first private page. The device 100 may also display the smile icon 1310 on Danny and Kathy in a phone number list which is set to be provided only in the first security mode. In order to notify the user that a current mode is the first security mode, the device 100 may display the smile icon 1310 on the status information window.

Referring to 1300-3, the device 100 may receive a third user input (e.g., a security code #2) via the locked screen. The device 100 may enter a second security mode, based on the third user input (e.g., the security code #2). In this case, the device 100 may display a second private page which corresponds to the second security mode. Also, the device 100 may display a second indicator on the second private page or the status information window. The second indicator may include, but is not limited to, an icon (e.g. a star icon), a text (e.g., S2), a color (e.g., a green color), or a background image (e.g., a water drop image) that are for identifying the second security mode (or the second private page).

In response to a star icon 1320 being pre-selected as the icon for identifying the second security mode, the device 100 may display the star icon 1320 on an area (e.g., an upper left area) of the second private page. Also, the device 100 may display the star icon 1320 on Mary in a phone number list which is set to be provided only in the second security mode. In order to notify the user that a current mode is the second security mode, the device 100 may display the star icon 1320 on the status information window.

Hereinafter, a method of the device 100 providing notice information, in response to a notice event related to an object included in a private page occurring during a normal mode status or a locked screen status, will now be described in detail with reference to FIG. 14.

Figure 14:
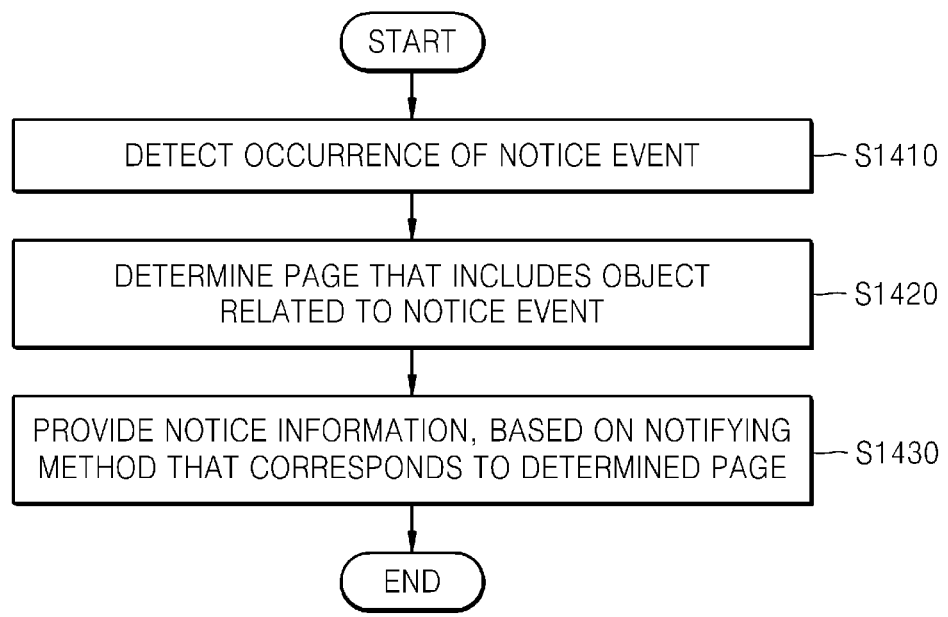
FIG. 14 is a flowchart of a method of providing notice information related to an object included in a private page, according to an respectively embodiment.

FIG. 14 is a flowchart of a method of providing notice information related to an object included in a private page, according to an exemplary embodiment.

In operation S1410, the device 100 may detect an occurrence of a notice event. For example, the device 100 may receive a push notice message related to at least one application. Alternatively, a preset notice situation may occur in the device 100.

In operation S1420, the device 100 may determine a page that includes an object related to the notice event. The object may include, but is not limited to, an application, at least one function of the application, or at least one piece of data or an item which is provided by the application.

In response to the notice event related to a first application occurring, the device 100 may determine whether the first application is included in a normal page or a private page. In addition, the device 100 may determine whether the first application is included in a first private page which corresponds to a first security mode or a second private page which corresponds to a second security mode.

In operation S1430, the device 100 may provide the notice information, based on a notifying method that corresponds to the determined page. For example, in response to a push notice message related to an object included in the normal page being received, the device 100 may display all contents of the push notice message on a locked screen. In response to a push notice message related to an object included in the private page being received, the device 100 may display, on a status information window, an icon that corresponds to the private page, and thus may notify the user that the push notice message is received. The notifying method is now described in detail with reference to FIG. 15.

Figure 15:
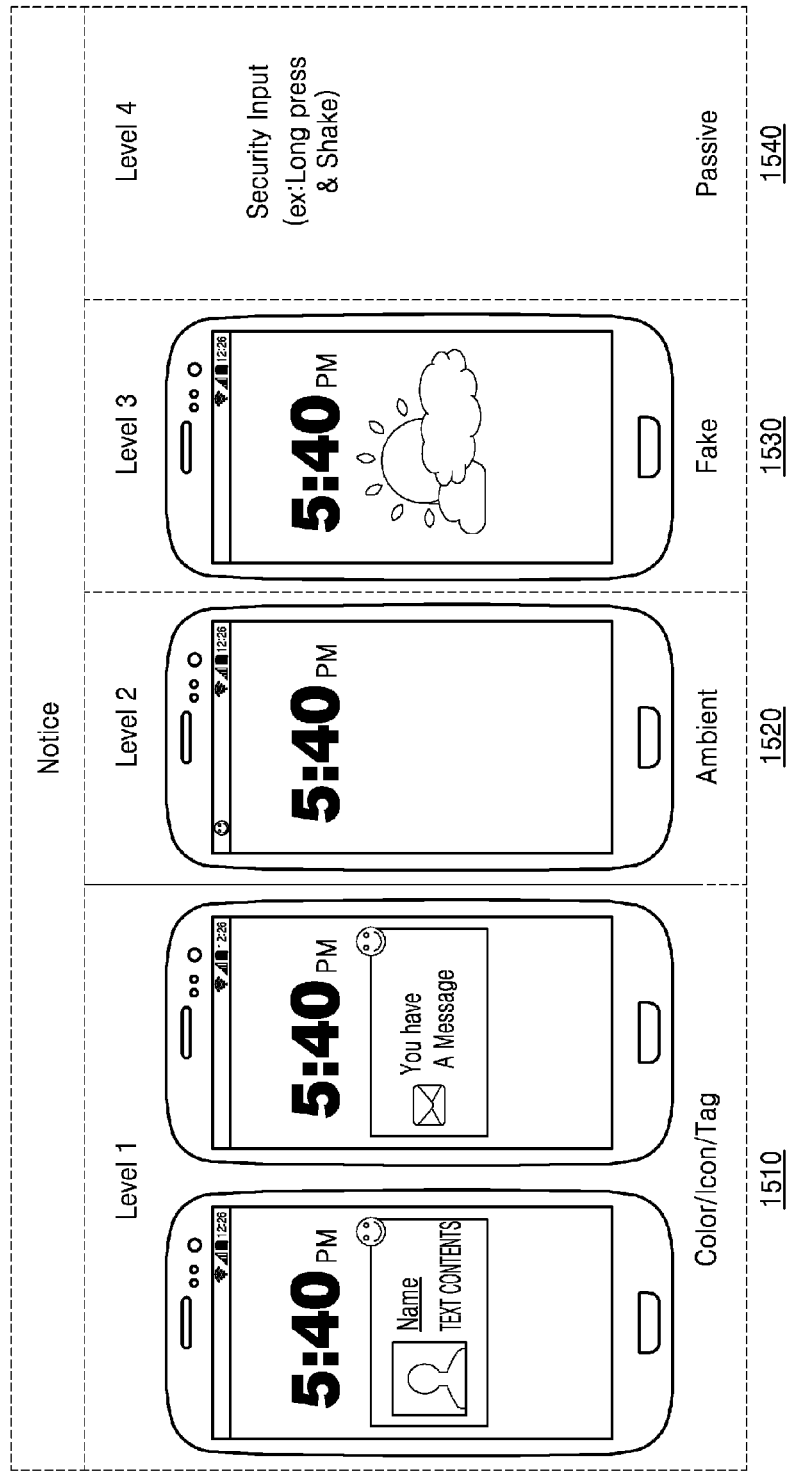
FIG. 15 illustrates notice levels according to an respectively embodiment.

FIG. 15 illustrates notice levels according to an exemplary embodiment.

Referring to 1510, a user may select a first notice level as a notice level that corresponds to a private page (or a security mode). In response to a notice event related to an object included in the private page occurring, the device 100 may display notice information at a notice level equal to a normal mode. For example, the device 100 may display all contents of a notice message or may apparently display a notice window indicating that the notice message is received. Here, the device 100 may display an indicator (e.g., a smile icon) corresponding to the private page (or the security mode) on the notice message or the notice window, so that a user may intuitively recognize in which page the object related to the occurrence of the notice event is located.

According to an exemplary embodiment, in response to the device 100 providing the notice information related to the object included in the private page during the normal mode status or the locked screen status, the existence of the private page may be externally disclosed, and in this regard, the user may increase a security level of the notice information and thus may prevent the existence of the private page from being externally disclosed.

For example, referring to 1520, the user may select a second notice level as the notice level that corresponds to the private page (or the security mode). In this case, in response to the notice event related to the object included in the private page occurring, the device 100 may display the indicator (e.g., the smile icon) which corresponds to the private page (or the security mode) on a status information window.

Referring to 1530, the user may select a third notice level as the notice level that corresponds to the private page (or the security mode). In this case, in response to the notice event related to the object included in the private page occurring, the device 100 may display a preset fake image on the lock screen. For example, in response to the notice event related to the object included in the private page occurring, the device 100 may display a weather widget on the lock screen so as to induce the user to enter the security mode and to check the private page.

Referring to 1540, the user may select a fourth notice level as the notice level that corresponds to the private page (or the security mode). In this case, in response to the notice event related to the object included in the private page occurring, the device 100 may not display the notice information on the locked screen. However, in response to the device 100 receiving a security input (e.g., a touch input over a predetermined time, a shaking input over a predetermined number of times, etc.) which was preset by the user, the device 100 may display the notice information related to the object included in the private page on the screen.

The exemplary embodiment of FIG. 15 includes the first through fourth notice levels, but one or more exemplary embodiments are not limited thereto. The notice level may be departmentalized in other exemplary embodiments.

Figure 16:
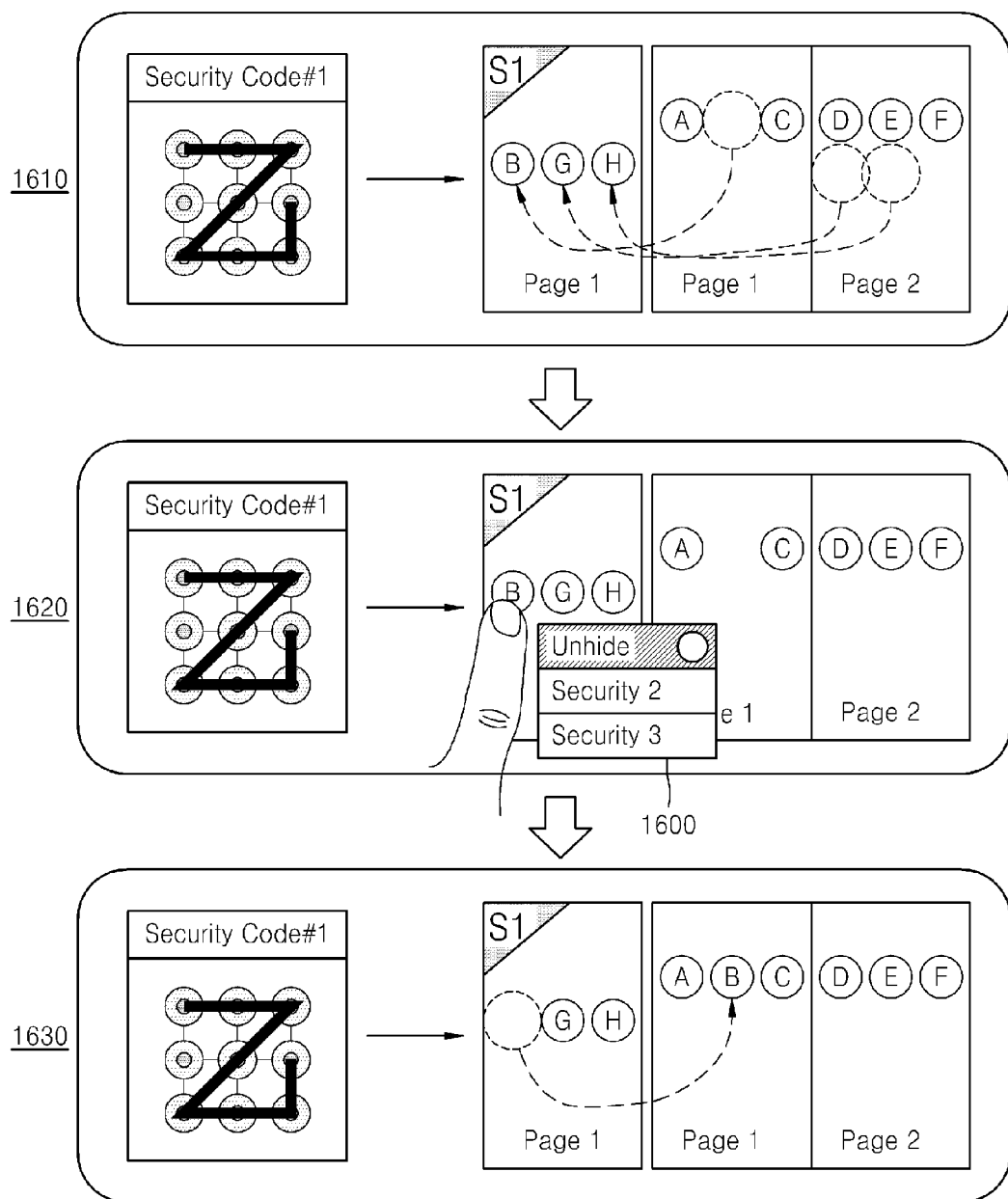
FIG. 16 illustrates an example in which one or more objects included in a private page are moved to a normal page, according to an respectively embodiment.

FIG. 16 illustrates an example in which one or more objects included in a private page are moved to a normal page, according to an exemplary embodiment.

Referring to 1610, a user may touch and drag a B application included in a first normal page to a first private page which corresponds to a first security mode while the user maintains the touch. Also, the user may touch and drag G and H applications included in a second normal page to the first private page corresponding to the first security mode while the user maintains the touch. Here, the B, G, and H applications that are moved to the first private page are prevented from being provided during a normal mode.

Referring to 1620, in response to the user touching an object (e.g., the B application) included in the first private page over a predetermined period of time, the device 100 may display a movement window 1600 where the user may move the object (e.g., the B application) included in the first private page to the normal page or a private page of another security mode (e.g., a second security mode or a third security mode). In response to the user selecting 'unhide' from the movement window 1600, the device 100 may move the B application to the normal page.

In response to the user selecting the second security mode from the movement window 1600, the device 100 may request an input of a second security code that corresponds to the second security mode. In response to the device 100 receiving an input of the second security code from the user, the device 100 may move the object (e.g., the B application) included in the first private page to a second private page that corresponds to the second security mode.

Referring to 1630, the user may touch and drag the B application included in the first private page to the first normal page while the user maintains the touch. In this case, the device 100 may remove the B application from the first private page, and may display the B application on the first normal page. Also, the device 100 may provide the B application and information related to the B application during the normal mode.

Figure 17:
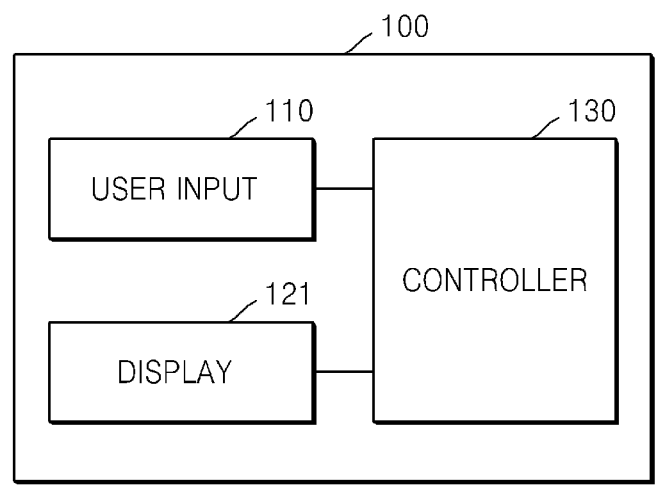
FIGS. 17 and 18 are block diagrams of devices according to respectively embodiments.
Figure 18:
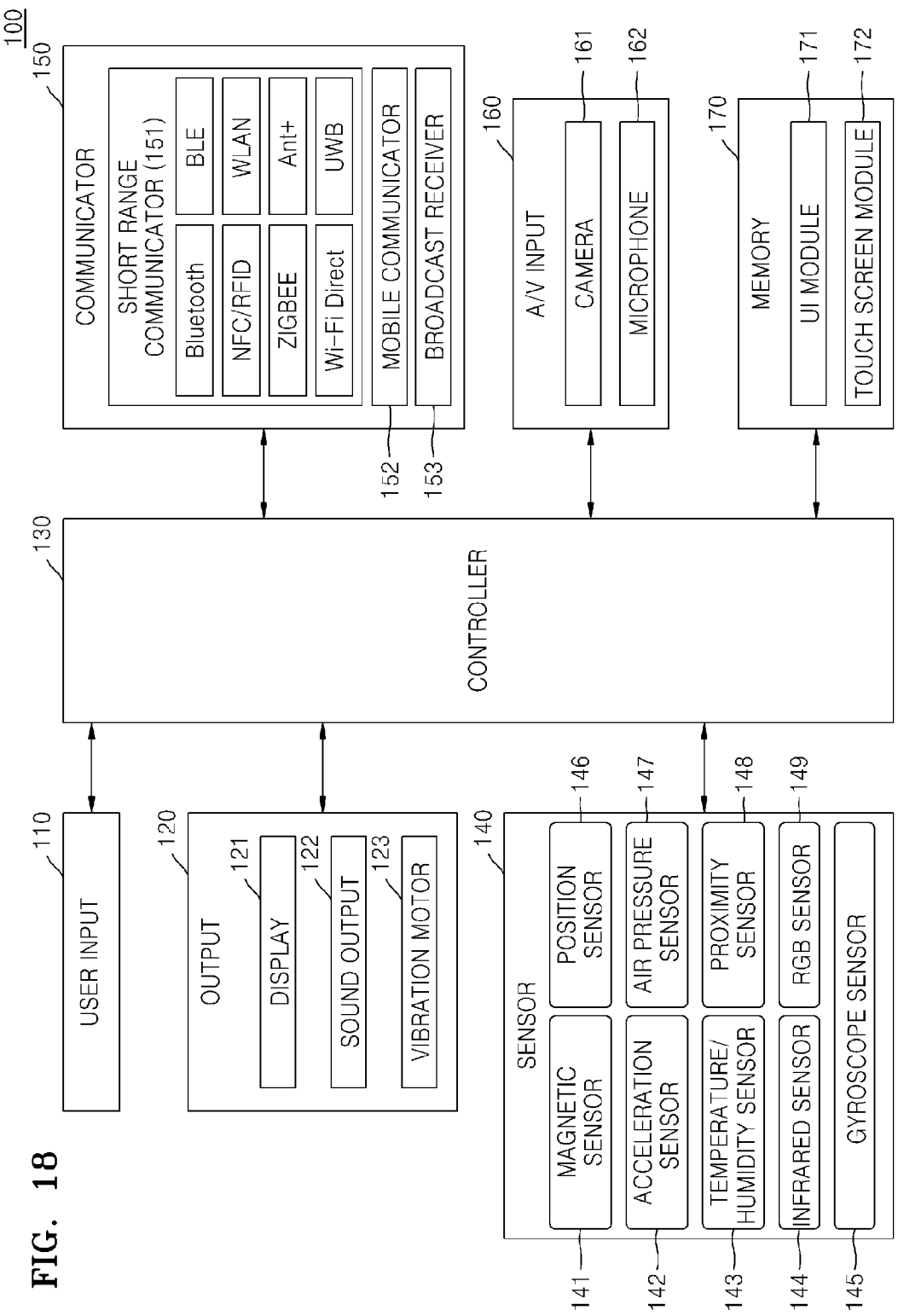

FIGS. 17 and 18 are block diagrams devices 100 according to exemplary embodiments.

As illustrated in FIG. 17, the device 100 may include a user input 110, a display 121, and a controller 130 (also, referred as a processor 130). However, not all shown elements are necessary elements. That is, the device 100 may be embodied with more or less elements than the shown elements.

For example, as illustrated in FIG. 18, the device 100 may further include a sensing device 140, a communicator 150, an audio/video (A/V) input 160, and a memory 170, as well as the user input 110, the output 120, and the processor 130.

Hereinafter, the elements are described below.

The user input 110 may be an input by which a user inputs data so as to control the device 100. For example, the user input 110 may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, and a jog switch, but one or more exemplary embodiments are not limited thereto.

The user input 110 may receive a user input of entering each mode. For example, the user input 110 may receive a first user input to enter a normal mode, and may receive a second user input to enter a security mode. In a case of a plurality of security modes, the user input 110 may receive user inputs that respectively correspond to the plurality of security modes.

The user input 110 may receive a user input of moving an object included in a normal page to a private page. The user input 110 may receive a user input of moving an object included in the private page to the normal page.

An output 120 may function to output an audio signal, a video signal, or a vibration signal and may include a display 121, a sound output 122, a vibration motor 123, or the like.

The display 121 displays and outputs information that is processed in the device 100. During a call mode, the display 121 may display a user interface (UI) or GUI that is related to a phone call, and during the security mode, the display 121 may further display the private page as well as the normal page that is provided during the normal mode. The private page may include at least one object that is selected by the user so as to be provided during the security mode.

The display 121 may display a predetermined indicator which indicates the private page on the private page. The predetermined indicator may include at least one of a predetermined color, a predetermined background image, a predetermined icon, and a predetermined text. Also, the display 121 may display an indicator, which corresponds to the private page (or the security mode), on the at least one object included in the private page. The display 121 may display, on a status information window, an image that corresponds to the private page (or the security mode).

In response to the display 121 and a touch pad forming a mutual layer structure and then formed as a touch screen, the display 121 may be used as both an output device and input device, e.g., an I/O. The display 121 may include at least one of a liquid crystal display (LCD), a thin film transistor-liquid crystal display (TFT-LCD), an organic light-emitting diode display, a flexible display, a 3D display, and an electrophoretic display. Also, according to a type of the device 100, the device 100 may include at least two displays 121. The at least two displays 121 may face each other through the use of a hinge.

The sound output 122 may output audio data that is received from the communicator 150 or is stored in the memory 170. The sound output 122 may also output a sound signal (e.g., a call signal receiving sound, a message receiving sound, or the like) related to capabilities performed by the device 100. The sound output 122 may include a speaker, a buzzer, or the like.

The vibration motor 123 may output a vibration signal. For example, the vibration motor 123 may output the vibration signal that corresponds to an output of the audio data (e.g., the call signal receiving sound, the message receiving sound, or the like) or video data. In response to a touch being input to the touch screen, the vibration motor 123 may output a vibration signal.

The controller 130 may generally control all operations of the device 100. That is, the controller 130 may control the user input 110, the output 120, the sensing device 140, the communicator 150, the A/V input 160, the memory 170, etc. by executing programs stored in the memory 170.

The controller 130 may enter the security mode based on a user input, and may extract the private page that corresponds to the security mode. For example, the controller 130 may enter a first security mode based on a first user input, and may enter a second security mode based on a second user input.

The controller 130 may distinguish between the first user input and the second user input, based on at least one of pattern information, number information, information about a user's gaze direction, information about a user's face, fingerprint information, tilt information, and motion information that are input to a locked screen.

The controller 130 may prevent the at least one object, which is included in the private page, from being provided during the normal mode. For example, the controller 130 may prevent a first object included in the private page and information related to the first object from being provided during the normal mode. The information related to the first object may include, but is not limited to, at least one of an icon of the first object, installation information related to the first object, notice information related to the first object, and usage history information related to the first object.

The controller 130 may extract a second object related to the first object that was moved to the private page, and may prevent the second object or information related to the second object from being provided during the normal mode.

The controller 130 may extract an occurrence of a notice event. For example, the controller 130 may determine a page that includes an object related to the notice event, and may provide notice information, based on a notifying method that corresponds to the determined page.

The sensor 140 may sense a status of the device 100 or a status around the device 100, and may deliver information related to the sensed status to the controller 130.

The sensor 140 may include at least one of a magnetic sensor 141, an acceleration sensor 142, a temperature/humidity sensor 143, an infrared sensor 144, a gyroscope sensor 145, a position sensor (e.g., GPS) 146, an air pressure sensor 147, a proximity sensor 148, and an RGB sensor (i.e., a luminance sensor) 149, but one or more exemplary embodiments are not limited thereto. Functions of the sensors may be intuitionally deduced by one of ordinary skill in the art by referring to names of the sensors, thus, detailed descriptions thereof are omitted herein.

The communicator 150 may include one or more elements allowing communication between the device 100 and an external device or between the device 100 and a server (not shown). For example, the communicator 150 may include a short range communication unit 151, a mobile communication unit 152, and a broadcast receiver 153.

The short range communicator 151 may include, but is not limited thereto, a Bluetooth® communication unit, a BLE communication unit, an NFC/RFID unit, a Wi-Fi communication unit, a ZigBee® communication unit, an IrDA communication unit, a WFD communication unit, a UWB communication unit, an Ant+ communication unit, or the like.

The mobile communicator 152 exchanges a wireless signal with at least one of a base station, an external terminal, and a server on a mobile communication network. The wireless signal may include various types of data according to communication of a sound call signal, a video call signal, or a text/multimedia message.

The broadcast receiver 153 receives a broadcast signal and/or information related to broadcast from the outside through a broadcast channel. The broadcast channel may include a satellite channel and a ground wave channel. According to an exemplary embodiment, the first device 100 may not include the broadcast receiver 153.

The A/V input 160 may receive an input of an audio signal or a video signal and may include a camera 161 and a microphone 162. The camera 161 may obtain an image frame such as a still image or a video via an image sensor during a video call mode or an image-capturing mode. An image that is captured via the image sensor may be processed by the controller 130 or a separate image processing unit (not shown).

The image frame that is processed by the camera 161 may be stored in the memory 170 or may be transmitted to an external source via the communicator 150. According to a configuration of the device 100, two or more cameras 161 may be arranged.

The microphone 162 receives an external sound signal as an input and processes the received sound signal into electrical voice data. For example, the microphone 162 may receive a sound signal from an external device or a speaker. In order to remove noise that occurs while the sound signal is externally input, the microphone 162 may use various noise removing algorithms.

The memory 170 may store a program for processing and controlling the controller 130, or may store a plurality of pieces of input/output data (e.g., a user input that corresponds to the security mode, a predetermined indicator that corresponds to the security mode or the private page, a notifying method that corresponds to the security mode, etc.).

The memory 170 may include a storage medium of at least one type of a flash memory, a hard disk, a multimedia card type memory, a card type memory such as an SD or XD card memory, RAM, SRAM, ROM, EEPROM, PROM, a magnetic memory, a magnetic disc, and an optical disc. Also, the device 100 may run web storage or a cloud server that performs a storage function of the memory 170, on the Internet.

The programs stored in the memory 170 may be classified into a plurality of modules according to their functions, for example, into a UI module 171, a touch screen module 172, etc.

The UI module 171 may provide a specialized UI or GUI in connection with the device 100 for each application. The touch screen module 172 may detect a user's touch gesture on the touch screen and transmit information related to the touch gesture to the controller 130. The touch screen module 172 may recognize and analyze a touch code. The touch screen module 172 may be configured by additional hardware including a controller.

Various sensors may be arranged in or near the touch screen so as to detect a touch or a proximate touch on the touch sensor. An example of the sensor to detect the touch on the touch screen may include a tactile sensor. The tactile sensor detects a contact of a specific object by at least as much as a person can detect. The tactile sensor may detect various types of information such as the roughness of a contact surface, the hardness of the contact object, the temperature of a contact point, or the like.

An example of the sensor to detect the touch on the touch screen may include a proximity sensor.

The proximity sensor detects the existence of an object that approaches a predetermined detection surface or that exists nearby, by using a force of an electro-magnetic field or an infrared ray, instead of a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture (i.e., an input) of the user may include a tap gesture, a touch & hold gesture, a double tap gesture, a drag gesture, a panning gesture, a flick gesture, a drag & drop gesture, a swipe gesture, or the like.

One or more exemplary embodiments may also be embodied as programmed commands to be executed in various computer means, and then may be recorded in a non-transitory computer-readable recording medium. The computer-readable recording medium may include one or more of the programmed commands, data files, data structures, or the like. The programmed commands recorded to the computer-readable recording medium may be particularly designed or configured for one or more exemplary embodiments or may be well known to one of ordinary skill in the art. Examples of the computer-readable recording medium include magnetic media including hard disks, magnetic tapes, and floppy disks, optical media including CD-ROMs and DVDs, magneto-optical media including floptical disks, and hardware designed to store and execute the programmed commands in ROM, RAM, a flash memory, and the like. Examples of the programmed commands include not only machine code generated by a compiler but also include a high-level programming language to be executed in a computer by using an interpreter.

According to the exemplary embodiments, the device 100 may provide a private page in which objects that a user does not want to externally disclose are collected.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments of the present invention have been described with reference to the figures, it will be understood by those of ordinary skill in the art that various changes in form and details may be made therein without departing from the spirit and scope of the present invention as defined by the following claims.

What is claimed is:

1. A method of providing a private page, the method comprising:
   entering a security mode based on a user input;
   extracting the private page that corresponds to the security mode; and
   providing both the private page and a normal page that is provided during a normal mode,
   wherein the private page comprises at least one object that is selected by a user so as to be provided during the security mode, the at least one object being movable by the user between the private page and the normal page,
   wherein the normal mode provides the normal page without the private page, the normal page comprises at least one object that is selected by the user so as to be provided during the normal mode.

2. The method of claim 1, wherein the at least one object is prevented from being provided during the normal mode.

3. The method of claim 1, wherein the at least one object comprises at least one of an application, at least one function provided by the application, and at least one content provided by the application.

4. The method of claim 1, further comprising:
   receiving a user input to move a first object comprised in the normal page to the private page;
   displaying the first object in the private page; and
   preventing the first object and information related to the first object from being provided during the normal mode.

5. The method of claim 4, wherein the information related to the first object comprises at least one of an icon of the first object, installation information related to the first object, notice information related to the first object, and usage history information related to the first object.

6. The method of claim 4, wherein the preventing comprises:
   extracting a second object related to the first object; and
   preventing the second object or information related to the second object from being provided during the normal mode.

7. The method of claim 1, wherein the providing comprises displaying a predetermined indicator which indicates the private page on the private page.

8. The method of claim 7, wherein the predetermined indicator comprises at least one of a predetermined color, a predetermined background image, a predetermined icon, and a predetermined text.

9. The method of claim 1, further comprising displaying an indicator on the at least one object comprised in the private page, wherein the indicator corresponds to the private page.

10. The method of claim 1, further comprising displaying an image which corresponds to the security mode on a status information window.

11. The method of claim 1, further comprising:
    detecting an occurrence of a notice event;
    determining a page that comprises an object related to the notice event; and
    providing notice information, based on a notifying method that corresponds to the determined page.

12. The method of claim 11, wherein the providing of the notice information comprises:
    detecting an occurrence of a notice event related to an object comprised in the private page during the normal mode; and
    providing notice information related to the object, based on a notifying method that corresponds to the private page.

13. The method of claim 1, wherein the entering comprises receiving a second user input that is distinguished from a first user input to enter the normal mode.

14. The method of claim 1, wherein the security mode comprises a plurality of security modes that respectively correspond to a plurality of user inputs.

15. The method of claim 14, wherein the entering further comprises:
    entering a first security mode, based on a first user input; and
    entering a second security mode, based on a second user input.

16. The method of claim 15, wherein the entering of the security mode comprises distinguishing between the first user input and the second user input, based on at least one of pattern information, number information, information related to a user's gaze direction, information related to a user's face, fingerprint information, tilt information, and motion information that are input to a locked screen.

17. A device comprising:
    a user input configured to receive a user input;
    a controller configured to enter a security mode based on the received user input, and extract a private page that corresponds to the security mode; and
    a display configured to provide both the private page and a normal page that is provided during a normal mode,
    wherein the private page comprises at least one object that is selected by a user so as to be provided during the security mode, the at least one object being movable by the user between the private page and the normal page,
    wherein the normal mode provides the normal page without the private page, the normal page comprises at least one object that is selected by the user so as to be provided during the normal mode.

18. The device of claim 17, wherein upon being in a security mode, the controller is configured to prevent the at least one object from being provided during the normal mode.

19. The device of claim 17, wherein the at least one object comprises at least one of an application, at least one function provided by the application, and at least one content provided by the application.

20. The device of claim 17, wherein the user input is configured to receive a user input to move a first object comprised in the normal page to the private page,
    the display to display the first object on the private page, and
    the controller is configured to prevent the first object and information related to the first object from being provided during the normal mode.

21. The device of claim 20, wherein the information related to the first object comprises at least one of an icon of the first object, installation information related to the first object, notice information related to the first object, and use history information related to the first object.

22. The device of claim 20, wherein the controller is configured to extract a second object related to the first object, and prevent the second object or information related to the second object from being provided during the normal mode.

23. The device of claim 17, wherein the display is configured to display a predetermined indicator which indicates the private page on the private page.

24. The device of claim 23, wherein the predetermined indicator comprises at least one of a predetermined color, a predetermined background image, a predetermined icon and a predetermined text.

25. The device of claim 17, wherein the display is configured to display an indicator on the at least one object comprised in the private page, wherein the indicator corresponds to the private page.

26. The device of claim 17, wherein the display is configured to display an image which corresponds to the security mode on a status information window.

27. The device of claim 17, wherein the controller is configured to detect an occurrence of a notice event, determine a page that comprises an object related to the notice event, and provides notice information, based on a notifying method that corresponds to the determined page.

28. The device of claim 27, wherein the controller is configured to detect an occurrence of a notice event related to an object comprised in the private page during the normal mode, and provide notice information related to the object, based on a notifying method that corresponds to the private page.

29. The device of claim 17, wherein the user input is configured to receive a second user input that is distinguished from a first user input of entering the normal mode.

30. The device of claim 17, wherein the security mode comprises a plurality of security modes that respectively correspond to a plurality of user inputs.

31. The device of claim 30, wherein the controller is configured to enter a first security mode, based on a first user input, and enters a second security mode, based on a second user input different from the first user input.

32. The device of claim 31, wherein the controller is configured to distinguish between the first user input and the second user input, based on at least one of pattern information, number information, information about a user's gaze direction, information about a user's face, fingerprint information, tilt information and motion information that are input to a lock screen.

33. A non-transitory computer-readable recording medium having recorded thereon a program, wherein the program, when executed by a processor of a computer, causes the computer to execute the method of claim 1.

34. A plural mode device having a normal mode and at least one security mode, the device comprising:
 a user input configured to receive an input from a user to enter a normal mode or to enter one or more security modes; and
 a controller configured to enter a device into a normal mode in response to an input for a normal mode being input by a user, and to enter a device into a security mode in response to an input to enter a security mode being input by the user, wherein in normal mode a user accesses one or more normal pages and in security mode the user accesses the one or more normal pages and one or more pages designated by the user as private pages, wherein the one or more private pages comprise at least one object that is selected by a user so as to be provided during the security mode, the at least one object being movable by the user between the private page and the normal page,
 wherein the normal mode provides the normal page without the one or more private pages, the normal page comprises at least one object that is selected by the user so as to be provided during the normal mode.

35. The plural mode device of claim 34, further comprising a display to display the one or more normal pages in normal mode and display both the one or more private pages and the one or more normal pages in security mode.

36. The plural mode device of claim 34, wherein the controller is configured to prevent private pages from being displayed during normal mode.

37. The plural mode device of claim 34, wherein the at least one object comprises at least one of an application, at least one function provided by the application, and at least one content provided by the application.

38. The plural mode device of claim 34, wherein the user input is configured to receive a user input to move a first object comprising a normal page to the one or more private pages.

* * * * *